US012769262B2

(12) United States Patent
Williams

(10) Patent No.: US 12,769,262 B2
(45) Date of Patent: Oct. 20, 2026

(54) ENERGY STORAGE SYSTEM CONTROL

(71) Applicant: Nabors Drilling Technologies USA, Inc., Houston, TX (US)

(72) Inventor: Kevin R. Williams, Cypress, TX (US)

(73) Assignee: NABORS DRILLING TECHNOLOGIES USA, INC., Houston, TX (US)

(*) Notice: Subject to any disclaimer, the term of this patent is extended or adjusted under 35 U.S.C. 154(b) by 853 days.

(21) Appl. No.: 18/062,174

(22) Filed: Dec. 6, 2022

(65) Prior Publication Data

US 2023/0205146 A1 Jun. 29, 2023

Related U.S. Application Data

(60) Provisional application No. 63/266,045, filed on Dec. 27, 2021.

(51) Int. Cl.
*G05B 13/02* (2006.01)
*H02J 3/38* (2026.01)
(Continued)

(52) U.S. Cl.
CPC ............ *G05B 13/024* (2013.01); *H02J 3/381* (2013.01); *H02J 7/50* (2026.01); *H02J 7/80* (2026.01);
(Continued)

(58) Field of Classification Search
CPC ...... G05B 13/024; H02J 3/381; H02J 7/0013; H02J 7/0047; H02J 2207/20;
(Continued)

(56) References Cited

U.S. PATENT DOCUMENTS

| | | | |
|---|---|---|---|
| 4,309,734 A | 1/1982 | Warren | |
| 7,615,893 B2 | 11/2009 | Biester et al. | |

(Continued)

FOREIGN PATENT DOCUMENTS

| | | | |
|---|---|---|---|
| CN | 105350926 A | 2/2016 | |
| CN | 105480884 A | 4/2016 | |

(Continued)

OTHER PUBLICATIONS

CleanDesign Power Systems Inc., "Fuel & Emissions Calculation Overview", published Nov. 11, 2019, www.cleandesignic.com, 10 pages.

(Continued)

*Primary Examiner* — Charles R Kasenge
(74) *Attorney, Agent, or Firm* — Alston & Bird LLP

(57) ABSTRACT

A method for managing a power system is provided and can include energizing an alternating current (AC) bus via one or more generators, rectifying energy from the AC bus to power a direct current (DC) bus, powering one or more loads electrically coupled to the DC bus, monitoring a DC voltage of the DC bus, detecting a magnitude and a rate of change of the DC voltage or AC frequency from a predetermined value, and transferring an amount of power between the DC bus or the AC bus, and an energy storage system electrically coupled to the buses to return the DC voltage or AC frequency substantially to the predetermined value, wherein the amount of power is based on the magnitude and rate of change.

19 Claims, 10 Drawing Sheets

(51) Int. Cl.
*H02J 7/00* (2026.01)
*H02J 7/50* (2026.01)
*H02J 7/80* (2026.01)

(52) U.S. Cl.
CPC ....... *H02J 2207/20* (2020.01); *H02J 2207/50* (2020.01)

(58) Field of Classification Search
CPC .......... H02J 2207/50; H02J 3/32; H02J 7/345; H02J 7/35; H02J 9/062
See application file for complete search history.

(56) References Cited

U.S. PATENT DOCUMENTS

| | | | | |
|---|---|---|---|---|
| 7,633,248 | B1 | 12/2009 | Williams | |
| 7,923,946 | B2 | 4/2011 | Williams | |
| 8,184,460 | B2 | 5/2012 | O'Brien et al. | |
| 8,295,950 | B1 | 10/2012 | Wordsworth et al. | |
| 8,446,037 | B2 | 5/2013 | Williams | |
| 9,059,587 | B2 | 6/2015 | Williams | |
| 9,065,300 | B2 | 6/2015 | Williams | |
| 9,197,071 | B2 | 11/2015 | Williams | |
| 9,394,770 | B2 | 7/2016 | Boot et al. | |
| 9,450,433 | B2 | 9/2016 | Di Cristofaro | |
| 9,496,702 | B2 | 11/2016 | Dong et al. | |
| 9,535,410 | B2 | 1/2017 | Di Cristofaro | |
| 9,628,016 | B2 | 4/2017 | Lamascus et al. | |
| 9,803,461 | B2 | 10/2017 | Boone | |
| 9,856,719 | B1 | 1/2018 | Williams | |
| 10,044,189 | B2 | 8/2018 | Williams | |
| 10,100,835 | B2 | 10/2018 | Torrey et al. | |
| 10,283,966 | B2 | 5/2019 | Macdonald | |
| 10,337,424 | B2 | 7/2019 | Janik | |
| 10,389,113 | B2 | 8/2019 | Bourgeau | |
| 10,483,765 | B2 | 11/2019 | Pedersen | |
| 10,797,510 | B2 | 10/2020 | Foo et al. | |
| 11,196,278 | B2 | 12/2021 | Agamy et al. | |
| 2009/0195074 | A1 | 8/2009 | Buiel | |
| 2009/0312885 | A1 | 12/2009 | Buiel | |
| 2011/0043160 | A1* | 2/2011 | Serban | G05F 1/67 320/101 |
| 2011/0074165 | A1 | 3/2011 | Grimes et al. | |
| 2014/0077600 | A1 | 3/2014 | Cryer et al. | |
| 2014/0103727 | A1* | 4/2014 | Taimela | H02J 3/28 307/76 |
| 2015/0073616 | A1* | 3/2015 | Kamiyama | G05B 15/02 700/297 |
| 2017/0373498 | A1 | 12/2017 | Haugan et al. | |
| 2019/0115758 | A1 | 4/2019 | Orban et al. | |
| 2019/0199122 | A1 | 6/2019 | Petit | |
| 2019/0226296 | A1 | 7/2019 | Rakhunde et al. | |
| 2019/0267805 | A1 | 8/2019 | Kothuru et al. | |
| 2020/0144853 | A1 | 5/2020 | Andersen et al. | |
| 2020/0169088 | A1 | 5/2020 | Myers | |
| 2020/0220135 | A1 | 7/2020 | Pedersen | |
| 2020/0270948 | A1 | 8/2020 | Kothuru et al. | |
| 2021/0107616 | A1 | 4/2021 | Pedersen | |
| 2022/0145730 | A1 | 5/2022 | Benson et al. | |
| 2022/0162933 | A1 | 5/2022 | El Tawy et al. | |
| 2022/0234408 | A1 | 7/2022 | Jonson | |
| 2024/0063636 | A1 | 2/2024 | Vanderschueren et al. | |

FOREIGN PATENT DOCUMENTS

| | | | |
|---|---|---|---|
| CN | 209170031 | U | 7/2019 |
| CN | 213235031 | U | 5/2021 |
| EP | 2583368 | B1 | 6/2019 |
| WO | 2019084530 | A1 | 5/2019 |
| WO | 2019088899 | A1 | 5/2019 |
| WO | 2020070201 | A1 | 4/2020 |
| WO | 2020219091 | A1 | 10/2020 |
| WO | 2021113953 | A1 | 6/2021 |

OTHER PUBLICATIONS

International Search Report and Written Opinion for PCT/US2022/080971, mailed Apr. 24, 2023, 10 pages.

* cited by examiner

ENERGY STORAGE SYSTEM CONTROL

CROSS-REFERENCE TO RELATED APPLICATION(S)

This application claims priority under 35 U.S.C. § 119(e) to U.S. Provisional Application No. 63/266,045, entitled "ENERGY STORAGE SYSTEM CONTROL," by Kevin R. WILLIAMS, filed Dec. 27, 2021, which is assigned to the current assignee hereof and incorporated herein by reference in its entirety.

FIELD OF THE DISCLOSURE

The present invention relates, in general, to the field of subterranean operations, such as, dredging, excavating, or drilling and processing of wells. More particularly, present embodiments relate to a system and method for charging/discharging and energy storage system during subterranean operations or other power intensive and power volatile operations.

BACKGROUND

Many systems, such as drilling rigs, excavators, dredgers, digging systems, etc., may have high power requirements that may dictate operation of one or more generators to produce the needed power. A particular characteristic of these systems is that power demand can be volatile, such as spiking to max power and then back down to idle power demand and then back up to max or at least a higher power demand. These are generally referred to as power "peaks." Regarding diesel generators, they run more efficiently if they are loaded at high capacity (e.g., >90% capacity) and they maintain a substantially constant RPM. However, due to the volatile power demand, generators can be constantly ramping up and then down to track the load. Therefore, improvements in high-power systems are continually needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of managing a power. The method can include energizing an alternating current (AC) bus via one or more generators; rectifying energy from the AC bus to power a direct current (DC) bus; powering one or more loads electrically coupled to the DC bus; monitoring a DC voltage of the DC bus; detecting a magnitude and a rate of change of the DC voltage (VDC) from a predetermined VDC level; and transferring an amount of power between the DC bus and an energy storage system (ESS) electrically coupled to the DC bus to return the DC voltage substantially to the predetermined VDC level, where the amount of power is based on the magnitude and rate of change of the DC voltage. Other embodiments of this aspect include corresponding computer systems, apparatus, and computer programs recorded on one or more computer storage devices, each configured to perform the actions of the methods.

One general aspect includes a method of managing a power. The method can include energizing an alternating current (AC) bus via one or more generators; rectifying energy from the AC bus to power a direct current (DC) bus; powering one or more loads electrically coupled to the DC bus; monitoring an AC voltage of the AC bus; detecting a change in frequency of the AC voltage from a predetermined AC voltage frequency to a changed AC voltage frequency; and transferring an amount of power between the AC bus and an energy storage system (ESS) electrically coupled to the AC bus to return the frequency of the AC voltage substantially to the predetermined AC voltage frequency, where the amount of power is based on a magnitude of the change in the frequency of the AC voltage. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (5%) for the value are reasonable differences from the ideal goal of exactly as described. A significant difference can be when the difference is greater than ten percent (5%).

Figure 1:
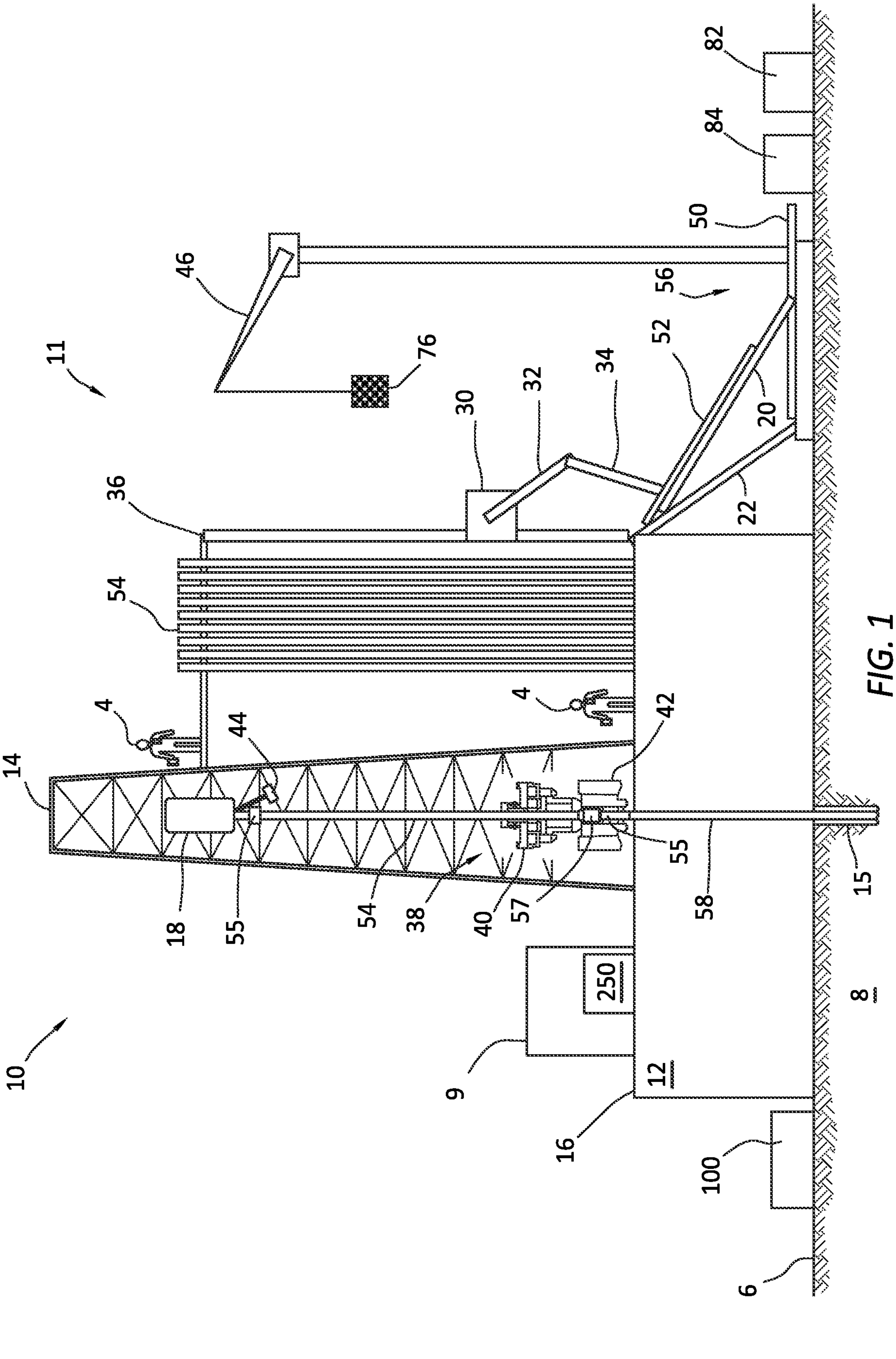
FIG. 1 is a representative simplified front view of a rig being utilized for a subterranean operation, in accordance with certain embodiments.

As used herein, "tubular" refers to an elongated cylindrical tube and can include any of the tubulars manipulated around a rig, such as tubular segments, tubular stands, tubulars, and tubular string, but not limited to the tubulars shown in FIG. 1. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

FIG. 1 is a representative simplified front view of a rig 10 at a rig site 11 being utilized for a subterranean operation (e.g., tripping in or out a tubular string to or from a wellbore), in accordance with certain embodiments. The rig site 11 can include the rig 10 with its rig equipment, along with equipment and work areas that support the rig 10 but are not necessarily on the rig 10. The rig 10 can include a platform 12 with a rig floor 16 and a derrick 14 extending up from the rig floor 16. The derrick 14 can provide support for hoisting the top drive 18 as needed to manipulate tubulars. A catwalk 20 and V-door ramp 22 can be used to transfer horizontally stored tubular segments 50 to the rig floor 16. A tubular segment 52 can be one of the tubular segments 50 stored in a horizontal storage area 56 that is being transferred to the rig floor 16 via the catwalk 20. A pipe handler 30 with articulating arms 32, 34 can be used to grab the tubular segment 52 from the catwalk 20 and transfer the tubular segment 52 to the top drive 18, the vertical storage area 36, the wellbore 15, etc. However, it is not required that a pipe handler 30 be used on the rig 10. The top drive 18 can transfer tubulars directly to and directly from the catwalk 20 (e.g., using an elevator 44 coupled to the top drive).

The tubular string 58 can extend into the wellbore 15, with the wellbore 15 extending through the surface 6 into the subterranean formation 8. When tripping the tubular string 58 into the wellbore 15, tubulars 54 are sequentially added to the tubular string 58 to extend the length of the tubular string 58 into the earthen formation 8. FIG. 1 shows a land-based rig. However, it should be understood that the principles of this disclosure are equally applicable to off-shore rigs where "off-shore" refers to a rig with water between the rig floor and the earth surface 6.

When tripping the tubular string 58 out of the wellbore 15, tubulars 54 are sequentially removed from the tubular string 58 to reduce the length of the tubular string 58 in the wellbore 15. The pipe handler 30 can be used to remove the tubulars 54 from an iron roughneck 38 or a top drive 18 at a well center 24 and transfer the tubulars 54 to the catwalk 20, the vertical storage area 36, etc. The iron roughneck 38 can break a threaded connection between a tubular 54 being removed and the tubular string 58. A spinner assembly 40 can engage a body of the tubular 54 to spin a pin end 57 of the tubular 54 out of a threaded box end 55 of the tubular string 58, thereby unthreading the tubular 54 from the tubular string 58.

When tripping the tubular string 58 into the wellbore 15, tubulars 54 are sequentially added to the tubular string 58 to increase the length of the tubular string 58 in the wellbore 15. The pipe handler 30 can be used to deliver the tubulars 54 to a well center on the rig floor 16 in a vertical orientation and hand the tubulars 54 off to an iron roughneck 38 or a top drive 18. The iron roughneck 38 can make a threaded connection between the tubular 54 being added and the tubular string 58. A spinner assembly 40 can engage a body of the tubular 54 to spin a pin end 57 of the tubular 54 into a threaded box end 55 of the tubular string 58, thereby threading the tubular 54 into the tubular string 58. The wrench assembly 42 can provide a desired torque to the threaded connection, thereby completing the connection.

While tripping a tubular string into and out of the wellbore 15 can be a significant part of the operations performed by the rig, many other rig tasks are also needed to perform a well construction according to a digital well plan. For example, pumping mud, via pump(s) 84, at desired rates, maintaining downhole pressures (as in managed pressure drilling), maintaining, and controlling rig power systems, coordinating, and managing personnel on the rig during operations, performing pressure tests on sections of the wellbore 15, cementing a casing string in the wellbore, performing well logging operations, treating mud via a treatment system 82, as well as many other rig tasks.

A rig controller 250 can be used to control the rig 10 operations including controlling various rig equipment, such as the pipe handler 30, the top drive 18, the iron roughneck 38, the vertical storage area equipment, imaging systems, various other robots on the rig 10 (e.g., a drill floor robot), or rig power systems 200. The rig controller 250 can control the rig equipment autonomously (e.g., without periodic operator interaction,), semi-autonomously (e.g., with limited operator interaction such as initiating a subterranean operation, adjusting parameters during the operation, etc.), or manually (e.g., with the operator interactively controlling the rig equipment via remote control interfaces to perform the subterranean operation).

The rig controller 250 can include one or more processors with one or more of the processors distributed about the rig 10, such as in an operator's control hut 9, in the pipe handler 30, in the iron roughneck 38, in the vertical storage area 36, in the imaging systems, in various other robots, in the top drive 18, at various locations on the rig floor 16 or the derrick 14 or the platform 12, at a remote location off of the rig 10, at downhole locations, etc. It should be understood that any of these processors can perform control or calculations locally or can communicate to a remotely located processor for performing the control or calculations. Each of the processors can be communicatively coupled to a non-transitory memory, which can include instructions for the respective processor to read and execute to implement the desired control functions, as well as methods described in this disclosure. These processors can be coupled via a wired or wireless network.

The rig controller 250 can collect data from various data sources around the rig (e.g., sensors, user input, local rig reports, etc.) and from remote data sources (e.g., suppliers, manufacturers, transporters, company men, remote rig reports, etc.) to monitor and facilitate the execution of a digital well plan. A digital well plan is generally designed to be independent of a specific rig, whereas a digital rig plan is a digital well plan that has been modified to incorporate the specific equipment available on a specific rig to execute the well plan on the specific rig, such as rig 10. Therefore, the rig controller 250 can be configured to monitor and facilitate the execution of the digital well plan by monitoring and executing rig tasks in the digital rig plan.

Figure 2:
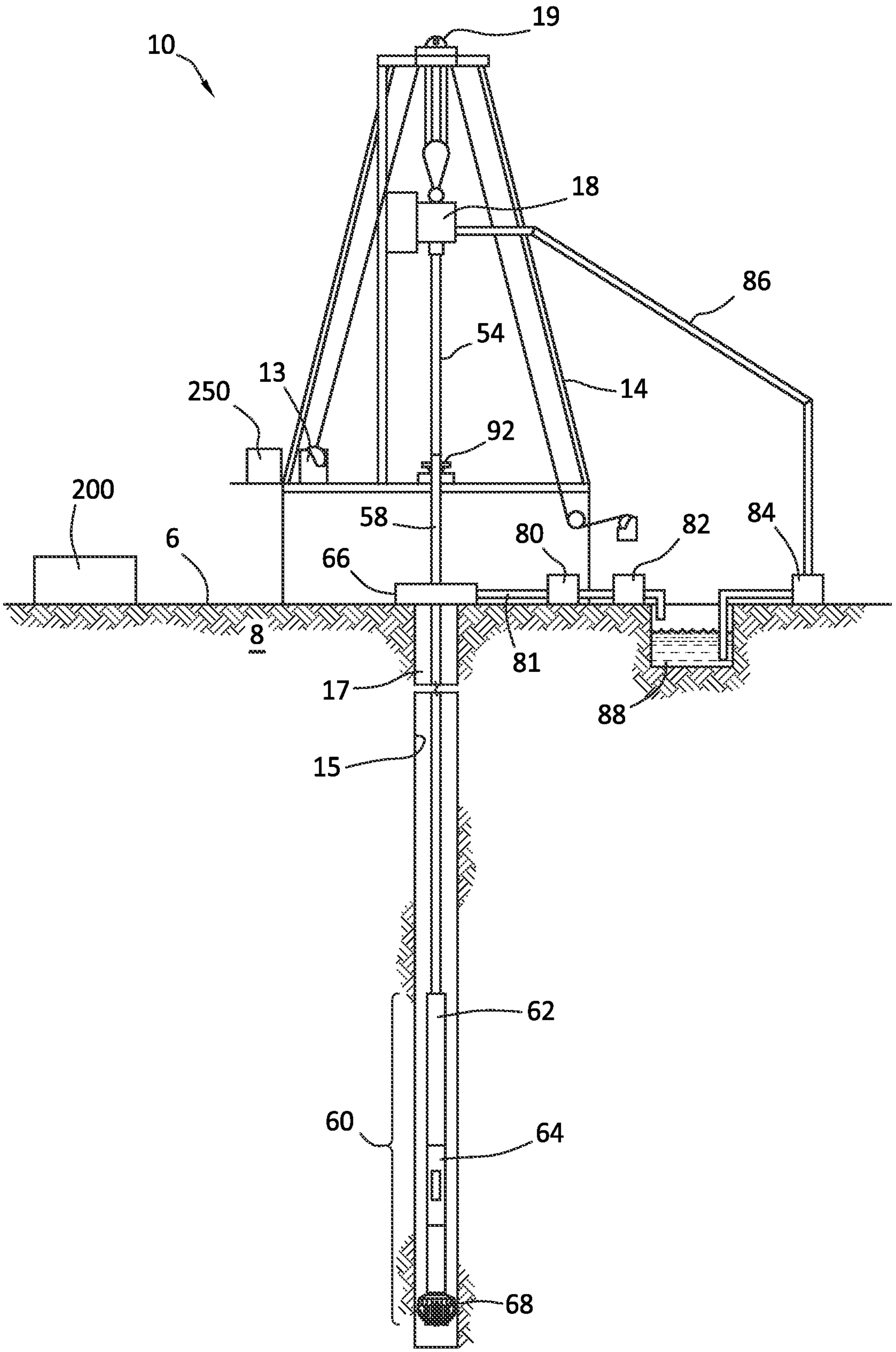
FIG. 2 is a representative partial cross-sectional view of a rig being utilized for a subterranean operation, in accordance with certain embodiments.

FIG. 2 is a representative partial cross-sectional view of a rig 10 being used to drill a wellbore 15 in an earthen formation 8. FIG. 2 shows a land-based rig, but the principles of this disclosure can equally apply to off-shore rigs, as well. The rig 10 can include a top drive 18 with a traveling block 19 used to raise or lower the top drive 18. A derrick 14 extending from the rig floor, can provide the structural support of the rig equipment for performing subterranean operations (e.g., drilling, treating, completing, producing, testing, etc.). The rig can be used to extend a wellbore 15 through the earthen formation 8 by using a tubular string 58 having a Bottom Hole Assembly (BHA) 60 at its lower end. The BHA 60 can include a drill bit 68 and multiple drill collars 62, with one or more of the drill collars including instrumentation 64 for LWD and MWD operations. During drilling operations, drilling mud can be pumped from the surface 6 into the tubular string 58 (e.g., via pumps 84 supplying mud to the top drive 18 via standpipe 86) to cool and lubricate the drill bit 68 and to transport cuttings to the surface via an annulus 17 between the tubular string 58 and the wellbore 15 and possibly through a rotating control device 66, such as with managed pressure drilling.

The returned mud can be directed to the mud pit 88 through the flow line 81 and the shaker 80. A fluid treatment 82 can inject additives as desired to the mud to condition the mud appropriately for the current well activities and possibly future well activities as the mud is being pumped to the mud pit 88. The pump 84 can pull mud from the mud pit 88 and drive it to the top drive 18 to continue the circulation of the mud through the tubular string 58.

Sensors (including imaging sensors) can be distributed about the rig and downhole to provide information on the environments in these areas as well as operating conditions, health of equipment, well activity of equipment, fluid properties, weight on bit WOB, rate of penetration ROP, revolutions per minute RPM of the tubular string 58, RPM of the drill bit 68, health of the power system 200, voltages, currents, and frequencies of the power system 200, etc.

As the rig 10 is performing a subterranean operation according to a digital well plan or digital rig plan, a power requirement for operating the rig equipment at the rig site can be volatile with large power load peaks returning to idle conditions. For example, when tripping a tubular string 58 out of the wellbore 15, each time the top drive 18 is raised by the drawworks 13 to raise the tubular string 58 the length of a pipe segment, a significant amount of power may be needed to operate the drawworks 13. However, when the tubular string 58 is lifted to the desired height, slips 92 on the rig floor 16 can be set to hold the weight of the tubular string 58, and the power to the drawworks 13 can be reduced since it is no longer holding the weight of the tubular string 58. The other rig equipment (roughneck 38, pipe handler 30, etc.) can then be used to remove the pipe segment from the tubular string 58. The process can be repeated until at least a portion of the tubular string 58 has been disassembled from the tubular string 58 and returned to a storage location.

This can be similar to the power requirements for large excavating equipment 600 (see FIG. 6) or dredging equipment 700 (see FIG. 7), which may require large power peaks when digging and moving a bucket full of material but may require much less power when moving an empty bucket.

Using generators to supply power to the rig equipment (or large excavating equipment or dredging equipment), the number of generators online may be determined by the highest peak of power required by the power loads (electric pumps, electric motors, etc.). However, the generators that are needed for the max power requirement may not be utilized very efficiently when not supplying the peak power load. Energy storage systems (ESS) as described in this disclosure can be coupled to the power buses of these power systems to supply peak power loads that can allow the generators to operate at substantially constant power, which can maximize their efficiencies. The ESS can also be used in power systems that draw source power from local utilities. By leveling out the power required from the utility power feeds, excess charges for peak loads can be minimized (or eliminated).

The ESS can store energy during times of low-power demand and deliver power to the power distribution system when a high-power demand is required. This disclosure provides a novel control system and methods for an ESS, which can include sending power to or receiving power from a common DC bus or sending power to or receiving power from a common AC bus.

Figure 3:
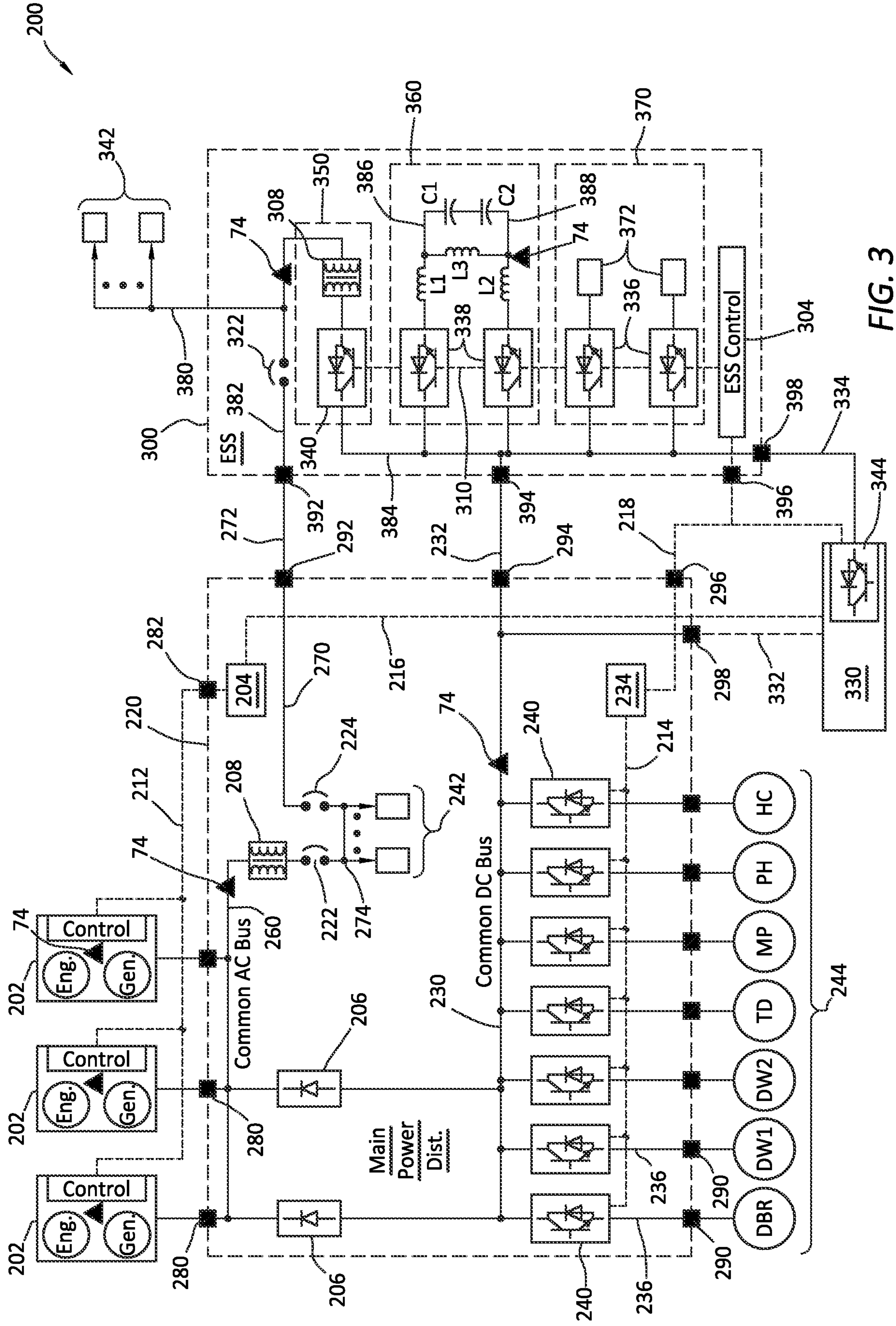
FIG. 3 is a representative circuit diagram of a power system with an energy storage system (ESS) for supplying power to augment a common direct current (DC) bus or a common AC bus; in accordance with certain embodiments.

FIG. 3 is a representative circuit diagram of a power system 200 with an energy storage system (ESS) 300 that can supply power to augment a common direct current (DC) bus 230 or a common alternating current (AC) bus 260. The power system 200 can include one or more generators 202, a power distribution system (PDS) 220, and an energy storage system (ESS) 300. The PDS 220 can receive AC power from the generators 202 via connections 280, convert the AC power, via rectifiers 206, to DC power supplied to the common DC bus 230, and convert DC power from the DC bus 230, via inverters 240, to AC power that can be supplied to the main motor loads 244 via connections 290. The PDS 220 can connect the common DC bus 230 to a DC bus 384 in the ESS 300, as well as connecting an AC bus 270 to an AC bus 382 in the ESS 300. The power system 200 can receive input power from a utility power source instead of having the input power supplied by one or more generators 202. The systems and methods of this disclosure can level out the power supplied by the generators 202 as well as level out power received from a utility power source, in the case when generators 202 are not used.

The power system 200 can include one or more generators 202 that are electrically connected in parallel to a common AC bus 260 in the PDS 220 and synchronize their AC phases and frequencies to supply power to the common AC bus 260. The rectifiers 206 can convert AC power from the common AC bus 260 and supply DC power to the common DC bus 230. The rectifiers 206 can be bi-directional, if desired. However, it may be preferred that the rectifiers 206 are unidirectional and transfer power only from the AC bus 260 to the DC bus 230. An isolation transformer 208 can convert AC power from the common AC bus 260 to an AC voltage VAC (e.g., 480 VAC) on an AC bus 274 to power auxiliary loads 242 when the breaker 222 is closed. These auxiliary loads 242 can include electric start motors, various rig equipment, Heating, Ventilation, and Air Conditioning (HVAC), etc.

The inverters 240 can convert DC power from the common DC bus 230 to AC power supplied to a main load 244 via an AC bus 236. The main loads 244 can include dynamic break resistors (DBR), drawworks (DW1, DW2) 13, a top drive (TD) 18, mud pumps (MP) 84, heave compensator HC, a pipe handler (PH) 30, a crane 46 carrying material 76, a catwalk 20, a roughneck 38, etc. The inverters 240 can also operate in an opposite direction by converting AC power on a bus 236 into DC power delivered to the common DC bus 230. This can be beneficial when one of the main loads changes from consuming power to producing power, which can be referred to as regenerative power. For example, when a drawworks 13 is unwinding to lower the top drive 18, the unwinding can generate AC power onto the AC bus 236, which can be converted to DC power by the inverter 240 and supplied to the common DC bus 230. The regenerated power can be directed to charging storage devices in the ESS 300. A variable frequency drive (VFD) controller 234 can be used to control the inverters 240 for converting power between the common DC bus 230 and an AC bus 236. The controller 234 can be a portion of the rig controller 250 or can be separate from the rig controller 250 and communicatively coupled to the rig controller 250.

The common DC bus 230 can be connected to the DC bus 384 in the ESS 300 via connections 294, 394, and DC bus 232. These and other connections described in connecting the power system 200 components can be quick connect/disconnect type connectors or they can be removable connections, such as using a fastener and a lug connection. The DC bus 384 can electrically couple the common DC bus 230 to the inverters 336, 338, 340 in the ESS 300. An ESS controller 304 can be a portion of the rig controller 250 or can be separate from the rig controller 250 and communicatively coupled to the rig controller 250. The ESS controller 304 can be communicatively coupled to the controller 234, the generator controller 204, and the inverters 336, 338, 340, via control lines 212, 214, 216, 218, 310 (and possibly couplings 282, 296, 396) which can represent either wired or wireless communications. The ESS controller 304 can coordinate with the controllers 204, 234 to manage power distribution in the power system 200. The controllers 204, 234, 304 can each receive sensor data from various sensors 74 disposed throughout the power system 200 to monitor conditions of the power system 200 components and initiate actions based on the sensor data.

FIG. 3 shows at least some of the possible locations for sensors 74 used to collect sensor data from components of the power system 200 (such as the common DC bus 230, the common AC bus 260, the generators 202, energy storage devices C1, C2, AC bus 380, etc.). However, it should be understood that more or fewer of the sensors 74 can be disposed within the power system 200 at various locations, such as monitoring the health of the power system components, environmental conditions, etc. The power system 200 can also receive sensor data from other sensors 74 disposed about the rig site 11, or receive communications based on the sensor data from the rig controller 250 (or at least other portions of the rig controller 250).

In a non-limiting embodiment, the ESS 300 can supply DC power to the common DC bus 230 thereby discharging the energy storage devices C1, C2 or receive DC power from the common DC bus 230 to charge the energy storage devices C1, C2 or dump power to the resistor load banks 372 to dissipate excess energy. The ESS 300 can receive AC power from the common AC bus 260 via breakers 222, 224, 322 and AC buses 270, 272, 274, 380, 382, deliver AC power to the auxiliary loads 242, 342 via the breakers 224, 322, and AC buses 270, 272, 274, 380, 382. The ESS 300 can deliver AC power to the common AC bus 260 via the breakers 222, 224, 322, AC buses 270, 272, 274, 380, 382, the isolation transformer 308, and the DC/AC inverter 340. The energy storage devices C1, C2 can be capacitors, supercapacitors, ultracapacitors, or combinations thereof. However, batteries can also be combined with one or more of the types of capacitors to provide more types of energy storage, but the batteries may not be able to supply an amount of instantaneous power that may be required to augment power to the common DC bus 230 or the common AC bus 260 as types of capacitors can. As used herein, a "supercapacitor" or "ultracapacitor" refers to a high-capacity capacitor with a capacitance value much higher than other capacitors such as electrolytic capacitors, but with lower voltage limits. It can typically store 10 to 100 times more energy per unit volume or mass than electrolytic capacitors and can accept and deliver charge much faster than batteries.

The ESS 300 can include an AC to DC interface 350 that can include the isolation transformer 308 and the DC/AC inverter 340. The ESS 300 can include an energy storage interface 360 that can include the energy storage devices C1, C2, the inverters 338, and the inductors L1, L2, L3. The ESS 300 can include a load bank resistor interface 370 that can include inverters 336, and load bank resistors 372.

In a non-limiting embodiment, at startup (e.g., when none of the generators 202 are energized and need to be started) DC power from the energy storage devices C1, C2 can be supplied to the auxiliary loads 242 or 342 to power an electric start motor that can be used to start one or more of the generators 202. This can be achieved via the ESS controller 304 selecting that DC power from the energy storage devices C1, C2 be supplied to the DC bus 384 via inverters 338. The ESS controller 304 can control the inverter 340 to receive DC power from the DC bus 384, convert it to AC power, and supply the AC power to the isolation transformer 308. The isolation transformer 308 can adjust the AC voltage from the inverter 340 to the AC voltage of the AC bus 380. The AC power from the isolation transformer 308 can drive the auxiliary loads 342 which are electrically coupled to the AC bus 380. Additionally, if the breakers 322 and 224 are closed, the AC power can be transmitted through the AC buses 382, 272, 270, 274 to power one or more of the auxiliary loads 242. The generator controller 204 can coordinate with the ESS controller 304 to facilitate getting power to the electric start motors and energizing one or more of the generators 202 via the electric start motors.

When one or more of the generators 202 are energized (e.g., a diesel, gas, or dual fuel generator engine driving a generator component of the generator 202), the one or more of the generators 202 can supply AC power to the common AC bus 260. Typically, the generators 202 can supply 480 VAC, 600 VAC, or 690 VAC power to the common AC bus 260. However, other voltages can be supplied by the generators in keeping with the principles of the current disclosure. The one or more of the generators 202 can also supply power to the auxiliary loads 242 via a closed breaker 222 and the isolation transformer 208, which can adjust the voltage from the common AC bus 260 to the required voltages to power the auxiliary loads 242. These auxiliary loads 242 can include one or more electric start motors that can be used to start one or more of the unenergized generators 202. Generator controller 204 can be used to control operation of the generators 202.

The rectifiers 206 can convert AC power from the common AC bus 260 to DC power to energize the common DC bus 230. With the common DC bus 230 energized, the VFD controllers 234 can selectively control the individual inverters 240 to power one or more of the main loads 244. At this point, operations (e.g., as rig operations on a rig 10, excavating operations on an excavator 600, dredging operations on a dredging machine 700, excavating operations on the dredging machine 700, etc.) can be performed.

Alternatively, or in addition to, the ESS 300 may not be sufficiently charged to provide power to the power system to perform the startup procedures, such as starting at least one of the generators 202. In this scenario, a portable energy storage system (PESS) 330 can be used, at least temporarily, to supply the necessary power to the power system 200 to perform the startup procedures. The PESS 330 can be one or more banks of energy storage devices (e.g., capacitors, supercapacitors, ultracapacitors, batteries, or combinations thereof) mounted to one or more bases or skids to facilitate transport via a conveyance vehicle (such as a truck, an 18-wheeler rig, etc.). The base can be small enough to be transported by a standard 4-wheel vehicle, such as a base that supports energy storage devices for starting generators 202 on an excavator 600, 700, or the base can be one or more skids that can support energy storage devices for starting generators 202 on an oil rig 10.

The PESS 330 can be electrically coupled to the main DC bus 384 in the ESS 300 via the DC bus 334 and coupling 398 or via an optional coupling 298 via the DC bus 332. An optional inverter 344 can be included with the PESS 330 to provide adjustable output DC voltage from the PESS to the ESS 300 or the common DC bus 230. The ESS controller 304 can sense the voltage supplied to the DC bus 384 from the PESS 330 via one or more sensors 74 and can control the inverters 338 to charge the energy storage devices C1, C2 or can control the inverter 340 to supply AC power to the AC bus 380 to power the auxiliary loads 342 (or auxiliary loads 242 as described above) to facilitate the startup procedures to energize one or more of the generators 202. Once the startup procedures or complete, the PESS 330 can be disconnected and shipped to another location for starting up another power system 200 or shipped to a storage facility. The PESS 330 can be provided by a third party that supplies a charged PESS 330 to a site to support startup procedures and then removes the PESS 330 when the startup is complete.

The PESS 330 can also be used to work in tandem with the energy storage devices C1, C2, if one or more portions of the energy storage devices C1, C2 are out of service. In this configuration, the PESS 330 can be controlled by the ESS controller 304, such as via network communication through control line 218, to support the functions of the ESS 300.

The ESS 300 can include load bank resistors (LBRs) 372 that can receive power from the DC bus 384 via the inverters 336 and dissipate the power in the LBRs 372. This can be useful if the energy storage devices C1, C2 are fully charged and the DC bus 384 has excess power which can raise the DC voltage on the DC bus 384 and thus the common DC bus 230. The inverters 336 can be controlled by the ESS controller 304 to dump the excess power to the LBRs 372. It can be noted that at least one of the main loads 244 can be a dynamic brake resistor module (DBR) that can also be used to dissipate excess power from the common DC bus 230. This dissipated power is lost via heat generated in the DBR, but this may be necessary to prevent the voltage of the common DC bus 230 from increasing past an undesirable level, which can prevent damage to the system.

In a non-limiting embodiment, the ESS 300 can include energy storage devices C1, C2 which can be used to store large quantities of energy and deliver that energy back to the power distribution system 220 as needed to provide DC power to the common DC bus 230 to power at least a portion of one or more of the main loads 244 during peak power requirements. The energy storage devices C1, C2 can also supply power to the common AC bus 260 by supplying DC power to the DC bus 384 via the inverters 338 (which can be controlled by the ESS controller 304), supplying power through the inverter 340, through the isolation transformer 308, and through the isolation transformer 208 to the common AC bus 260 (with breakers 222, 224, and 322 closed). This can be beneficial when the common AC bus 260 is being heavily loaded and causing the frequency of the common AC bus 260 voltage (or current) to drop. The drop in frequency can be detected by the sensor 74 and communicated to the controllers 204, 234, 304, which can cause the power from the energy storage devices C1, C2 to be routed to the common AC bus 260 to shore up the power being supplied by the common AC bus 260 and cause the frequency of the AC voltage (or current) of the common AC bus 260 to stabilize at a desired frequency. The inductors L1-L3 are representatively configured as shown to stabilize the energy being received at the energy storage devices C1, C2 or the energy as it is being transmitted from the energy storage devices C1, C2 over the DC buses 386, 388.

The ESS controller 304 can control the operation of the breakers 222, 224, 322 to facilitate routing energy to the desired AC or DC buses. However, the ESS controller 304 can also work in cooperation with the generator controller 204 or the VFD controllers 234 to operate the breakers 222, 224, 322, as needed, or the ESS controller 304 can work in cooperation with other portions of the rig controller 250 to operate the breakers 222, 224, 322.

In a non-limiting embodiment, couplings 292, 392, 294, 394, 296, 396, and control lines (or buses) 272, 232, 218 can be used to electrically couple the ESS 300 with the PDS 220. These connections can include quick disconnect connectors to allow for quicker assembly or disassembly of the power system 200. The ESS 300 can be mounted on one or more skids that can be used to transport one or more portions of the ESS 300 when moving the power system 200 to a new site, such as moving a rig 10 from a current rig site 11 to a new rig site 11. However, the connections can also be hardwired connections where assembly and disassembly are not driving design requirements. In these cases, such as with large excavators or dredging machines 600, 700, the ESS 300 can be installed with removable connections, such as with fasteners and lugs.

In a non-limiting embodiment, typical voltages for the common AC bus 260 can range from approximately 480 VAC up to approximately 690 VAC when supplied by the generators 202. The voltage of the common AC bus 260 can be approximately 480 VAC, approximately 600 VAC, approximately 690 VAC. When power is supplied to the AC bus 260 from utility power feeds, then the utility power determines the VAC ranges and the PDS 220 can be adapted to accommodate the utility power feeds.

In a non-limiting embodiment, typical voltages for the AC buses 270, 272, 274, 382, 380 can be approximately 480 VAC, 600 VAC, or 690 VAC for powering auxiliary loads 242, 342 on or off the rig 10 or on large excavators or dredging machines 600, 700.

In a non-limiting embodiment, typical voltage for the common DC bus 230 can range from approximately 650 VDC up to approximately 975 VDC for supplying power to the main loads 244 and the ESS 300. Voltages for the common DC bus 230 can be greater than 650 VDC, greater than 655 VDC, greater than 660 VDC, greater than 665 VDC, greater than 670 VDC, greater than 675 VDC, greater than 680 VDC, greater than 820 VDC, greater than 825 VDC, greater than 830 VDC, greater than 835 VDC, greater than 840 VDC, greater than 845 VDC, greater than 850 VDC, greater than 940 VDC, greater than 945 VDC, greater than 950 VDC, or greater than 955 VDC. Voltage for the common DC bus 230 can be less than 975 VDC, less than 970 VDC, less than 965 VDC, less than 960 VDC, less than 955 VDC, less than 950 VDC, less than 945 VDC, less than 940 VDC, less than 850 VDC, less than 845 VDC, less than 840 VDC, less than 835 VDC, less than 830 VDC, less than 825 VDC, less than 820 VDC, less than 680 VDC, less than 675 VDC, less than 670 VDC, less than 665 VDC, or less than 660 VDC. Therefore, voltage for the common DC bus 230 can range from greater than 650 VDC and less than 975 VDC, greater than 650 VDC and less than 680 VDC, greater than 820 VDC and less than 850 VDC, greater than 945 VDC, and less than 975 VDC, greater than 680 VDC and less than 820 VDC, greater than 850 VDC and less than 920 VDC, greater than 650 VDC and less than 670 VDC, greater than 820 VDC and less than 840 VDC, or greater than 945 VDC and less than 965 VDC.

In a non-limiting embodiment, typical voltages for the AC buses 236 can range from approximately 480 VAC to approximately 690 VAC for delivering power to the main loads 244 [e.g., dynamic break resistors (DBR), drawworks (DW1, DW2) 13, a top drive (TD) 18, mud pumps (MP) 84, a heave compensator (HC), a pipe handler (PH) 30, a crane 46, a catwalk 20, roughneck 38, etc.].

Figure 4A:
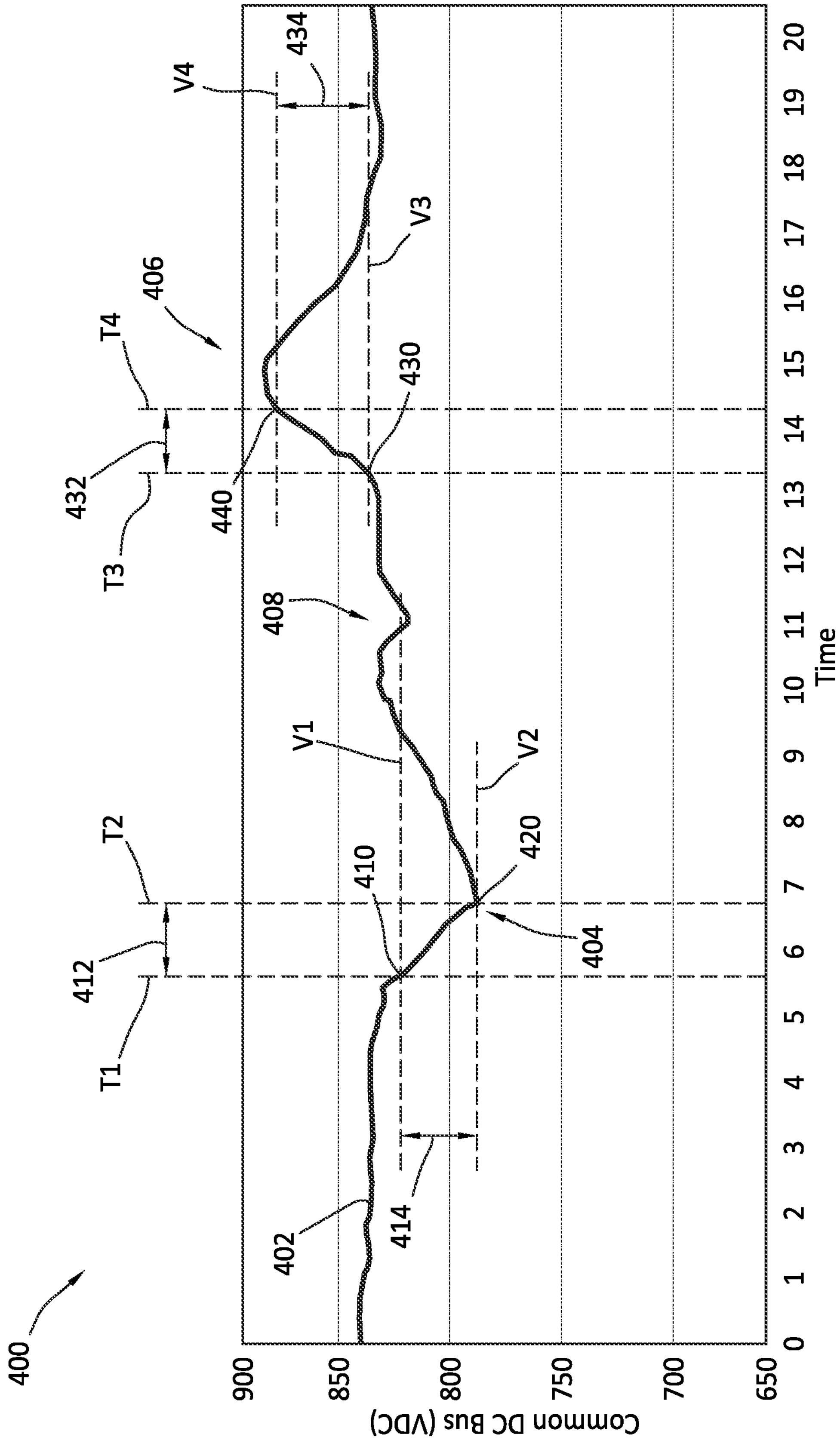
FIG. 4A is a representative plot of DC voltage (VDC) on a common DC bus of a power system, in accordance with certain embodiments.

FIG. 4A is a representative plot 400 of DC voltage (VDC) on a common DC bus 230 of a power system 200. The representative DC voltage is shown as signal 402 plotted as a function of voltage vs. time. The VDC range shown by the plot is for discussion purposes only, and it should be understood that the DC voltage, as stated above, can range from approximately 600 VDC up to approximately 1000 VDC. However, within this range, the DC voltage of the common DC bus 230 should remain substantially constant at a predetermined level during operations, such as substantially 670 VDC, substantially 840 VDC, substantially 965 VDC, or whatever VDC is desired for the common DC bus 230 to maintain.

Deviations from the predetermined VDC level can indicate issues with the power system 200, such as main loads 244 drawing more power than the common DC bus 230 can supply while maintaining the predetermined VDC level or the main loads 244 generating more power than the common DC bus 230 can receive while maintaining the predetermined VDC level. The ESS 300 of the current disclosure can manage these issues in a unique way and help the overall power system 200 maintain the predetermined VDC level on the common DC bus 230.

Referring again to FIG. 4A, sensors 74 on the common DC bus 230 can monitor the VDC and detect when the VDC drops below a predetermined VDC level, how fast the VDC drops, and transmit its data to the ESS controller 304 (or other controllers). By detecting the magnitude and rate of change of the voltage drop 404, the ESS controller 304 can detect a signature of the voltage drop and supply a predetermined amount of power from the ESS 300 to the common DC bus 230 to compensate for the voltage drop and return the VDC of the common DC bus 230 back to the predetermined VDC level.

The voltage drop 404 is shown dropping from a voltage V1 at time T1 (i.e., point 410 on signal 402) to voltage V2 at time T2 (i.e., point 420 on signal 402). The magnitude of the voltage change can be seen as delta-V 414 and the speed of the voltage change can be seen as delta-T 412. Therefore, the rate of change of the voltage drop 404 can be calculated by determining the absolute value of the ratio of [delta-V/delta-T]. The ratio can be seen as a signature for the voltage drop 404 event. The ESS controller 304 can compare the current signature (or ratio) of the voltage drop 404 with signatures stored in a signature database 316 (see FIG. 8) and determine an amount of power the ESS 300 may need to supply to the common DC bus 230 to compensate for the common DC bus 230 loading based on the signature.

For example, the signature (delta-V/delta-T) can indicate that a drawworks DW1 (or DW2) has been activated to raise the top drive 18 and is drawing power from the common DC bus 230 causing the voltage drop 404. With the signature identified, the ESS controller 304 can cause a first predetermined amount of power to be transferred from the energy storage devices C1, C2 to the common DC bus 230, thereby causing the common DC bus 230 to return substantially to the predetermined VDC level. The signature can also indicate an approximate weight of a tubular string being lifted by the top drive 18 and thus the drawworks DW1 (or DW2) since the voltage drops can vary based on the weight of the tubular string 58 at the time the tubular string is being raised.

For example, the signature (delta-V/delta-T) can indicate that a top drive TD has been activated to rotate a tubular string and is drawing power from the common DC bus 230 causing the voltage drop 404. With the signature identified, the ESS controller 304 can cause a second predetermined amount of power to be transferred from the energy storage devices C1, C2 to the common DC bus 230, thereby causing the common DC bus 230 to return substantially to the predetermined VDC level.

For example, the signature (delta-V/delta-T) can indicate that a pipe handler PH has been activated to manipulate a pipe segment and is drawing power from the common DC bus 230 causing the voltage drop 404. With the signature identified, the ESS controller 304 can cause a third predetermined amount of power to be transferred from the energy storage devices C1, C2 to the common DC bus 230, thereby causing the common DC bus 230 to return substantially to the predetermined VDC level.

For example, the signature (delta-V/delta-T) can indicate that a heave compensator HC has been activated to wind up a tension cable and is drawing power from the common DC bus 230 causing the voltage drop 404. With the signature identified, the ESS controller 304 can cause a fourth predetermined amount of power to be transferred from the energy storage devices C1, C2 to the common DC bus 230, thereby causing the common DC bus 230 to return substantially to the predetermined VDC level.

For example, the signature (delta-V/delta-T) can indicate that a combination of events are occurring simultaneously (e.g., a drawworks DW1 and a top drive TD being activated to raise and operate the top drive) and are drawing power from the common DC bus 230 causing the voltage drop 404. With the combination of the events identified, the ESS controller 304 can cause a fifth predetermined amount of power to be transferred from the energy storage devices C1, C2 to the common DC bus 230, thereby causing the common DC bus 230 to return substantially to the predetermined VDC level.

If the signature (delta-V/delta-T) of the voltage drop 404 is not found in the signature database 316, the ESS controller 304 can determine, based on the event, an estimated amount of power to deliver to the common DC bus 230 from the energy storage devices C1, C2 and monitor the VDC of the common DC bus 230 to determine when the amount of supplied power is sufficient to restore the common DC bus 230 to the predetermined VDC level. When the voltage drop 404 is managed, the ESS controller 304 can store a new signature (delta-V/delta-T) in the signature database 316 that is associated with the event for future comparisons.

Each signature in the signature database 316 can be associated with a predetermined amount of power that the ESS controller 304 can cause to be supplied by the ESS 300 to the common DC bus 230 to manage voltage drops, such as voltage drop 404.

The signature can also include environmental conditions, which can affect the amount of power to be delivered to the common DC bus 230 to mitigate the event. Therefore, each signature in the signature database 316 can include associated historical environmental conditions. If the actual environmental conditions for the event are different than the historical environmental conditions associated with the stored signature, the ESS controller 304 can adjust the amount of power to be delivered to the common DC bus 230 based on the comparison of the actual environmental conditions to the historical environmental conditions.

Some voltage drops, such as voltage drop 408, may drop below the predetermined VDC level, but return to a level above the predetermined VDC level before the ESS controller 304 detects a signature. In this case, the ESS controller 304 may not cause additional power to be transferred since the issue self-corrected without additional management by the ESS controller 304.

Referring again to FIG. 4A, sensors 74 on the common DC bus 230 can monitor the VDC and detect when the VDC spikes above a predetermined VDC level, how fast the VDC spikes, and transmit its data to the ESS controller 304 (or other controllers). By detecting the magnitude and rate of change of the voltage spike, the ESS controller 304 can detect a signature of the voltage spike and supply a predetermined amount of power to the ESS 300 from the common DC bus 230 to consume excess power from the common DC bus 230 and return the VDC of the common DC bus 230 back to the predetermined VDC level.

The voltage spike 406 is shown rising from a voltage V3 at time T3 (i.e., point 430 on signal 402) to voltage V4 at time T4 (i.e., point 440 on signal 402). The magnitude of the voltage change can be seen as delta-V 434 and the speed of the voltage change can be seen as delta-T 432. Therefore, the rate of change of the voltage spike 406 can be calculated by determining the absolute value of the ratio of [delta-V/delta-T]. The ratio can be seen as a signature for the voltage spike 406 event. The ESS controller 304 can compare the signature (or ratio) of the voltage spike 406 with signatures stored in a signature database 316 (see FIG. 8) and determine an amount of power the ESS 300 may need to consume from the common DC bus 230 to compensate for the common DC bus 230 spike based on the signature.

For example, the signature (delta-V/delta-T) can indicate that a drawworks DW1 (or DW2) is generating power such as when lowering the top drive and is supplying power to the common DC bus 230 causing the voltage spike 406. With the signature identified, the ESS controller 304 can cause a first predetermined amount of power to be transferred from the common DC bus 230 to the energy storage devices C1, C2, thereby charging the energy storage devices C1, C2 and causing the common DC bus 230 to return substantially to the predetermined VDC level. The signature can also indicate an approximate weight of a tubular string being lowered by the top drive 18 and thus the drawworks DW1 (or DW2) since the voltage spikes can vary based on the weight of the tubular string 58 at the time the tubular string is being lowered. If the amount of power to be transferred is more than the energy storage devices C1, C2 can receive, then the ESS controller 304 can direct the excess power to the load bank resistors 372 or the dynamic brake resistors DBR to be dissipated as heat.

For example, the signature (delta-V/delta-T) can indicate that a pipe handler PH is generating power such as when lowering a pipe segment (e.g., tubular 54, drill collar 62, BHA 60, etc.) and is supplying power to the common DC bus 230 causing the voltage spike 406. With the signature identified, the ESS controller 304 can cause a second predetermined amount of power to be transferred from the common DC bus 230 to the energy storage devices C1, C2, thereby charging the energy storage devices C1, C2 and causing the common DC bus 230 to return substantially to the predetermined VDC level. The signature can also indicate an approximate weight of the pipe segment 54 being lowered by the pipe handler PH since the voltage spikes can vary based on the weight of the pipe segment 54 being lowered. If the amount of power to be transferred is more than the energy storage devices C1, C2 can receive, then the ESS controller 304 can direct the excess power to the load bank resistors 372 or the dynamic brake resistors DBR to be dissipated as heat.

For example, the signature (delta-V/delta-T) can indicate that a heave compensator HC is generating power such as when unwinding to feed out a tension cable and is supplying power to the common DC bus 230 causing the voltage spike 406. With the signature identified, the ESS controller 304 can cause a third predetermined amount of power to be transferred from the common DC bus 230 to the energy storage devices C1, C2, thereby charging the energy storage devices C1, C2 and causing the common DC bus 230 to return substantially to the predetermined VDC level. If the amount of power to be transferred is more than the energy storage devices C1, C2 can receive, then the ESS controller 304 can direct the excess power to the load bank resistors 372 or the dynamic brake resistors DBR to be dissipated as heat.

The ESS controller 304 can also track the signature events over time and determine if a particular signature is occurring periodically. The ESS controller 304 can then predict future signature events (such as heave compensation events, which tend to be periodic in nature) and prepare to consume power from the common DC bus 230 according to the predicted signature event.

If the signature (delta-V/delta-T) of the voltage spike 406 is not found in the signature database 316, the ESS controller 304 can determine, based on the event, an estimated amount of power to divert from the common DC bus 230 to the energy storage devices C1, C2 or the load bank resistors 372 and monitor the VDC of the common DC bus 230 to determine when the amount of diverted power is sufficient to return the common DC bus 230 to the predetermined VDC level. When the voltage spike 406 is managed, the ESS controller 304 can store a new signature (delta-V/delta-T) in the signature database 316 that is associated with the event for future comparisons.

Each signature in the signature database 316 can be associated with a predetermined amount of power that the ESS controller 304 can cause to be diverted to the ESS 300 from the common DC bus 230 to manage voltage spikes, such as voltage spike 406.

The signature can also include environmental conditions, which can affect the amount of power to be diverted from the common DC bus 230 to mitigate the event. Therefore, each signature in the signature database 316 can have associated historical environmental conditions. If the actual environmental conditions for the event are different than the historical environmental conditions associated with the stored signature, the ESS controller 304 can adjust the amount of power to be consumed by the ESS 300 from the common DC bus 230 based on the comparison of the actual environmental conditions to the historical environmental conditions. For example, the amount of storage capacity in the energy storage devices C1, C2 can be affected by temperature.

Figure 4B:
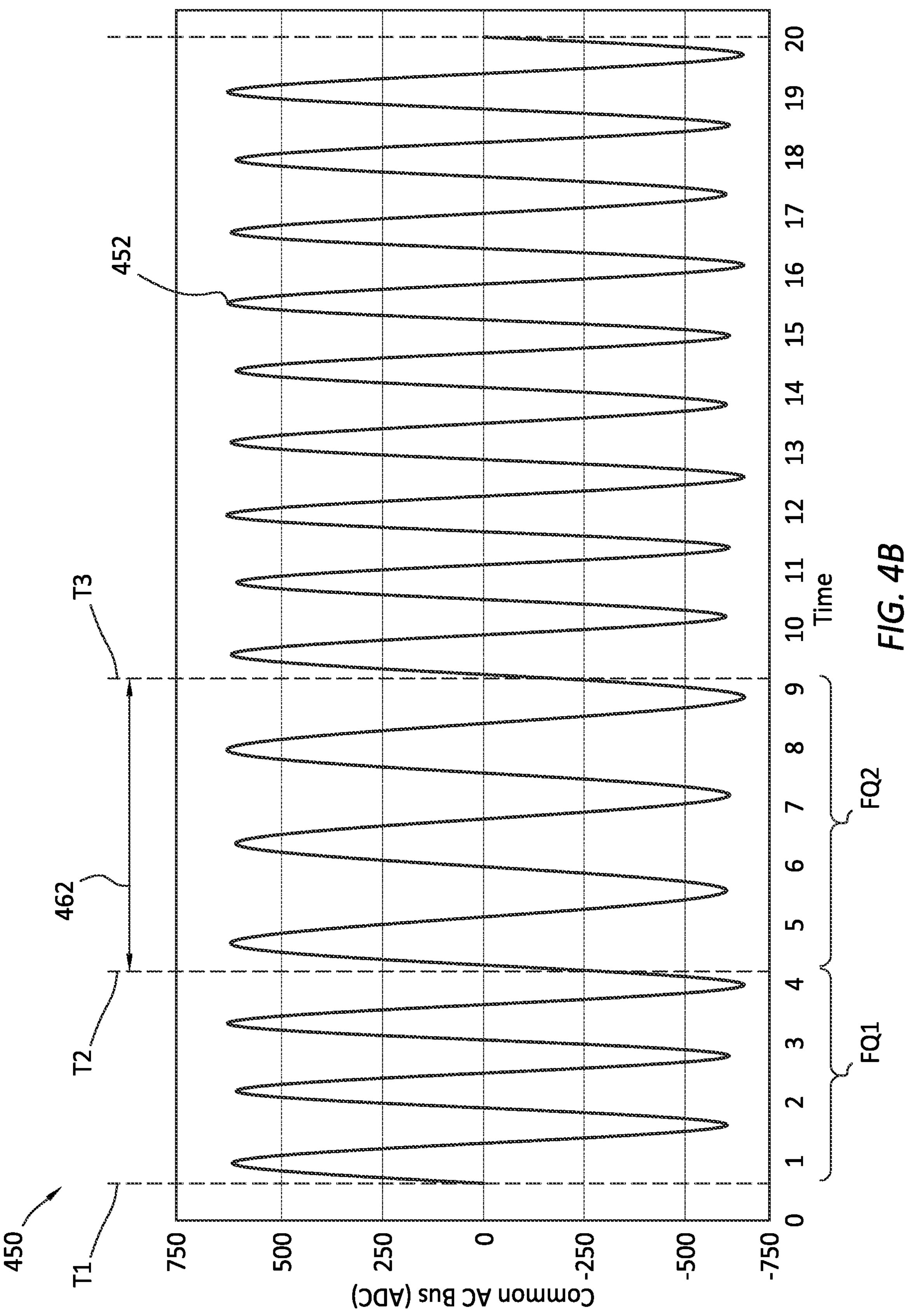
FIG. 4B is a representative plot of AC voltage (VAC) on a common AC bus of a power system, in accordance with certain embodiments.

FIG. 4B is a representative plot 450 of AC voltage (VAC) on a common AC bus 260 of a power system 200. The representative VAC is shown as signal 452 plotted as a function of voltage vs. time. The VAC range shown by the plot 450 is for discussion purposes only, but it should be understood that the AC voltage, as stated above, can range from approximately 480 VAC up to approximately 690 VAC when supplied by the generators 202. The frequency of the AC voltage on the common AC bus 260 can range from approximately 50 Hz to approximately 60 Hz. A sensor 74 on the common AC bus 260 can detect the current frequency and transmit the data to one or more of the controllers 204, 234, 304, 250. The frequency can be used to detect when issues occur with loading of the common AC bus 260. When the frequency is reduced, this can indicate that the power loading on the common AC bus 260 is more than the power being provided by the generators 202 to the common AC bus 260. If the frequency increases, this can indicate that the power loading on the common AC bus 260 has dropped significantly and that the generators 202 are providing too much power to the common AC bus 260. The generators 202 may not react to the change in load in time to prevent these changes in the VAC of the common AC bus 260.

The ESS 300 can be used in a novel way to mitigate the effects of the changing frequencies on the common AC bus 260 and help maintain (or at least quickly return) the frequency at substantially the predetermined AC voltage frequency (e.g., 50 Hz, 60 Hz, etc.).

In a non-limiting embodiment, a predetermined AC voltage frequency of the common AC bus 260 can be 60 Hz, indicated as FQ1 in FIG. 4B and measured as FQ1 at time T1 and before time T2. However, at time T2, the frequency changes to a reduced value FQ2 (e.g., 55 Hz, 56 Hz, 57 Hz, 58 Hz, 59 Hz, etc.) indicating that the load on the common AC bus 260 has increased significantly and is causing the one or more generators 202 to lug down under the increased load. Diesel generators can recover from a significant step load better than gas generators, so the diesel generators may be less at risk of stopping completely when hit with the step load. Gas generators may be at a higher risk of stopping completely when hit with the step load. In either case, providing auxiliary power to shore up the common AC bus 260 when the frequency change is detected can minimize emissions for diesel generators and prevent all out stop of a gas generator when the step load is added to the common AC bus 260.

The current disclosure provides a way for the ESS 300 to detect the magnitude and rate of change in frequency on the common AC bus 260 and supply auxiliary power to the common AC bus 260 from the ESS 300. When the one or more sensors 74 on the common AC bus 260 detect the magnitude and rate of change from frequency FQ1 to frequency FQ2 (shown during time interval 462 from time T2 to time T3), the ESS controller 304 can divert power from the DC bus 384, through the DC to AC inverter 340, through the isolation transformer 308 which converts the AC power to an AC voltage on the AC bus 380 (i.e., AC voltage of the AC bus 380 is determined by the AC voltage required to power the auxiliary loads 342), through closed breakers 322, 224, 222, and through the isolation transformer 208 that converts the AC voltage on the AC bus 270 to the AC voltage of the common AC bus 260. The ESS 300 can dump power through this circuit path to provide auxiliary power to the common AC bus 260 and cause the frequency to increase back to the desired frequency FQ1. When the frequency on the common AC bus 260 returns to the desired frequency FQ1, the ESS controller 304 can begin reducing the power from the ESS 300 until the path from the ESS 300 to the common AC bus 260 can be decoupled (e.g., opening any one of the breakers 222, 224, 322 or disabling the inverter 340).

In a non-limiting embodiment, a predetermined AC voltage frequency of the common AC bus 260 can be 60 Hz. One or more sensors 74 can detect a magnitude and rate of change in the frequency of the AC voltage of the common AC bus 260 to a changed AC voltage frequency (e.g., 61 Hz, 62 Hz, 63 Hz, 64 Hz, 65 Hz, etc.) indicating that the load on the common AC bus 260 has decreased significantly and is causing the one or more generators 202 to ramp-up under the decreased load.

The current disclosure provides a way for the ESS 300 to detect the magnitude and rate of change in frequency on the common AC bus 260 and direct power from the common AC bus 260 to the ESS 300. When the one or more sensors 74 on the common AC bus 260 detect magnitude and rate of change in the AC voltage frequency, the ESS controller 304 can divert power from the AC bus 260, through the isolation transformer 208 that converts the AC voltage on the common AC bus 260 to the AC voltage of the AC buses 270, 274, through the closed breakers 322, 224, 222, through the isolation transformer 308, which converts the AC voltage on the AC bus 380 to AC voltage input to the inverter 340, which converts the input DC voltage to the DC voltage of the DC bus 384. The power on the DC bus 384 can then be transferred through the inverters 338 to charge the energy storage devices C1, C2, or transferred through the inverters 336 to dissipate the power as heat in the resistor load banks 372.

The ESS 300 can receive power through this circuit path to charge the energy storage devices C1, C2 (or dissipate the power as heat in the resistor load banks 372) and cause the frequency to decrease back to the desired frequency FQ1. When the frequency on the common AC bus 260 returns to the desired frequency FQ1, the ESS controller 304 can begin reducing the power from the common AC bus 260 until the path from the common AC bus 260 to the ESS 300 can be decoupled (e.g., opening any one of the breakers 222, 224, 322 or disabling the inverter 340).

The one or more sensors 74 coupled to the AC bus can detect a magnitude and a rate of change of the frequency of the AC voltage. The magnitude and rate of change of the AC voltage frequency can be seen as a signature of an event which can be a change in the load powered by the AC bus 260. The signature of the event and can be used by the ESS controller 304 to determine the amount of power to supply to the common AC bus 260 from the ESS 300. When the magnitude and rate of change from the frequency FQ1 to the frequency FQ2 is detected, the ESS controller 304 can compare the signature with stored signatures in the signature database 316. Each stored signature can have a predetermined amount of power associated with it, and when the signature matches at least one of the stored signatures, the ESS controller 304, based on the signature, can supply the predetermined amount of power to the common AC bus 260 without having to calculate the predetermined amount of power.

If the signature is unknown (e.g., the signature does not compare to any of the stored signatures in the signature database 316), then the ESS controller 304 can supply a default amount of power to the common AC bus 260 and monitor the frequency to ensure the frequency has returned to FQ1. For example, the default amount of power can be 50% of the power rating of one or more of the generators 202. For example, if the power rating for a generator 202 is 1 megawatt (MW), the default amount of power can be 0.5 MW supplied from the ESS 300. If the frequency hasn't returned to FQ1, then additional power can be supplied until the frequency returns to approximately FQ1. The unknown signature can then be stored in the signature database 316 as another stored signature with the associated value of the amount of power that was needed to mitigate the event. The signature can also include environmental conditions, which can affect the amount of power that is to be delivered to mitigate the event. Therefore, each signature in the signature database 316 can have associated historical environmental conditions. If the current environmental conditions are different than the historical environmental conditions associated with the stored signature, the ESS controller 304 can adjust the amount of power to be delivered to the common AC bus 260 based on the comparison of the current environmental conditions to the historical environmental conditions.

Figure 5A:
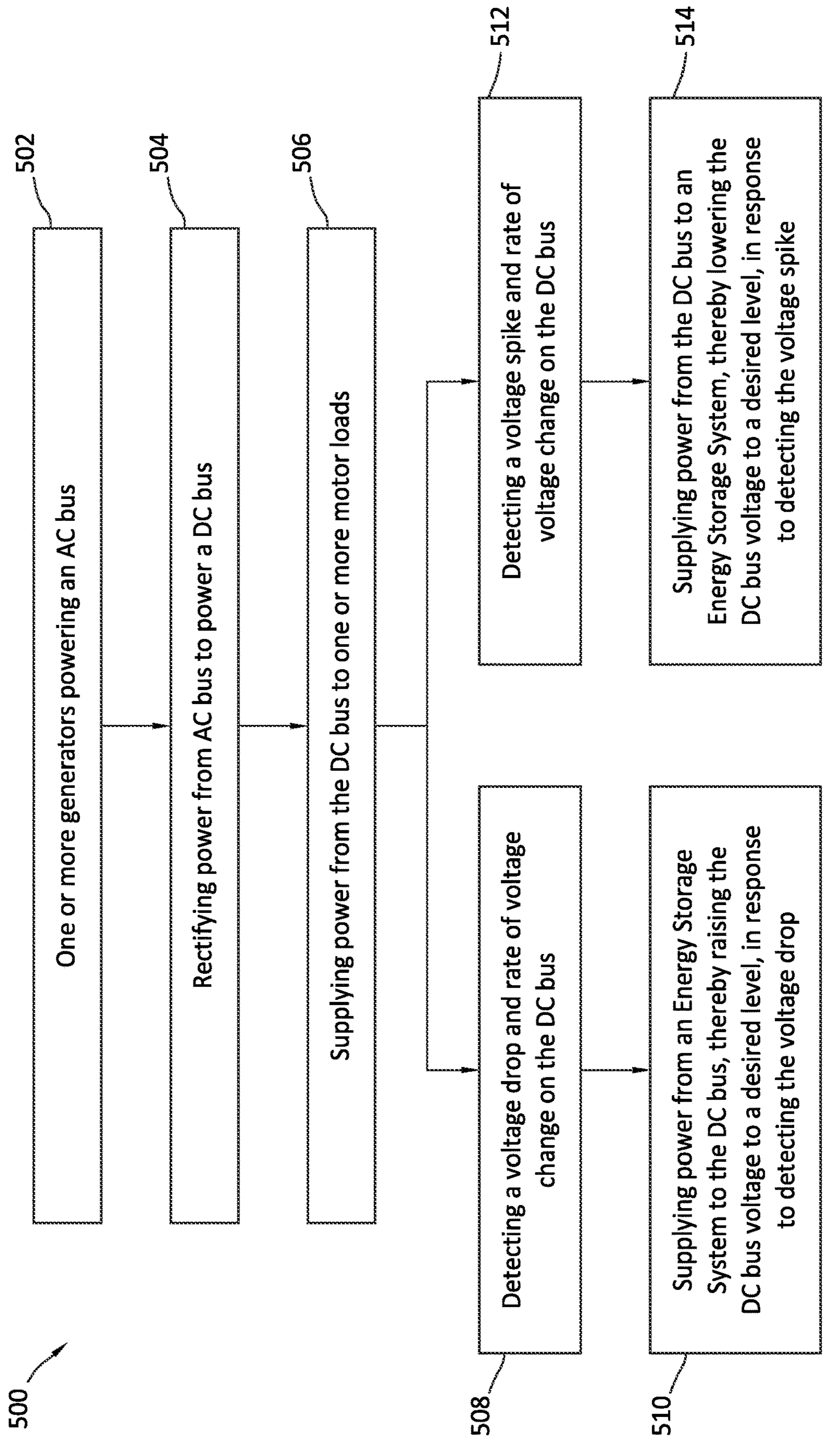
FIGS. 5A and 5B are representative flow diagrams of methods for managing power requirements of a power system with an ESS, in accordance with certain embodiments.

FIG. 5A is a representative flow diagram of a method 500 for managing power requirements of a power system 200 with an ESS 300. In operation 502, one or more generators 202 can be used to power the common AC bus 260. In operation 504, the power from the common AC bus 260 can be converted by rectifiers 206 to power the common DC bus 230. In operation 506, loads 244 (e.g., motor loads) can receive power from the common DC bus 230 via inverters 240.

If in operation 508, one or more sensors 74 coupled to the common DC bus 230 can detect a voltage drop which includes a magnitude of the change in DC voltage and a rate of change of the DC voltage, then the method can proceed to operation 510. In operation 510, the ESS controller 304 can determine a signature of the voltage drop based on the magnitude and rate of change of the DC voltage, compare the signature to a signature database 316, and based on the signature determine an amount of power to supply from the energy storage devices C1, C2 to the common DC bus 230 to cause the DC voltage on the common DC bus 230 to be raised back to the desired predetermined VDC level.

If in operation 512, one or more sensors 74 coupled to the common DC bus 230 can detect a voltage spike which includes a magnitude of the change in DC voltage and a rate of change of the DC voltage, then the method can proceed to operation 514. In operation 514, the ESS controller 304 can determine a signature of the voltage spike based on the magnitude and rate of change of the DC voltage, compare the signature to a signature database 316, and based on the signature determine an amount of power to divert from the common DC bus 230 to the energy storage devices C1, C2 to cause the DC voltage on the common DC bus 230 to be lowered back to the desired predetermined VDC level.

Figure 5B:
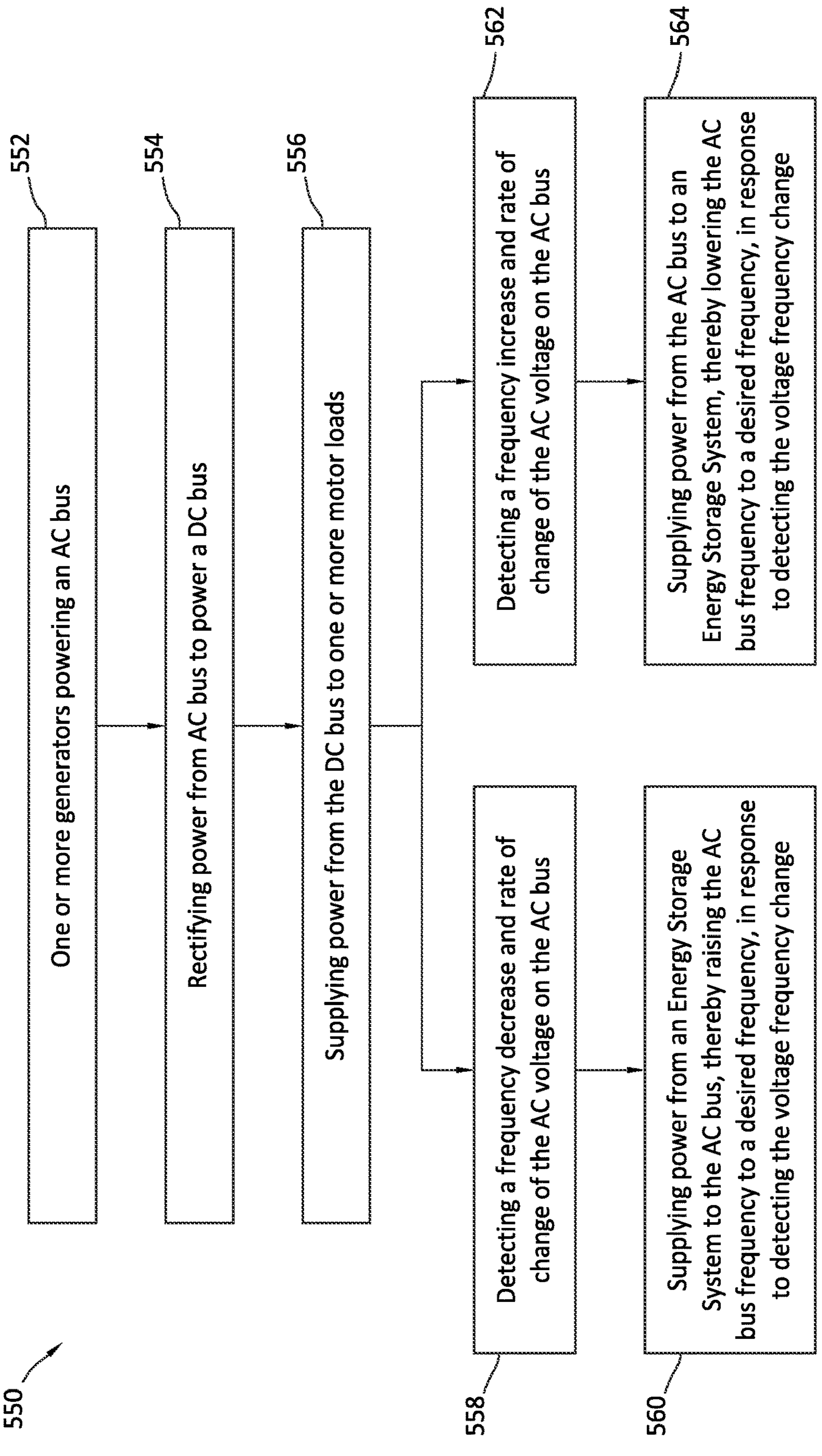

FIG. 5B is a representative flow diagram of a method 550 for managing power requirements of a power system 200 with an ESS 300. In operation 552, one or more generators 202 can be used to power the common AC bus 260. In operation 554, the power from the common AC bus 260 can be converted by rectifiers 206 to power the common DC bus 230. In operation 556, loads 244 (e.g., motor loads) can receive power from the common DC bus 230 via inverters 240. If in operation 558, one or more sensors 74 coupled to the common AC bus 260 detect a magnitude and a rate of change of a decrease in the frequency of the AC voltage on the common AC bus 260, then the method can proceed to operation 560. In operation 560, the ESS controller 304 can determine a signature of the frequency decrease, compare the signature to a signature database 316, and based on the signature determine an amount of power to supply from the energy storage devices C1, C2 to the common AC bus 260 to cause the frequency of the AC voltage on the common AC bus 260 to be returned to the desired frequency.

If in operation 562, one or more sensors 74 coupled to the common AC bus 260 detect a magnitude and a rate of change of an increase in the frequency of the AC voltage on the common AC bus 260, then the method can proceed to operation 564. In operation 564, the ESS controller 304 can determine a signature of the frequency increase, compare the signature to a signature database 316, and based on the signature determine an amount of power to divert from the common AC bus 260 to the energy storage devices C1, C2 to cause the frequency of the AC voltage on the common AC bus 260 to be returned to the desired frequency.

Figure 6:
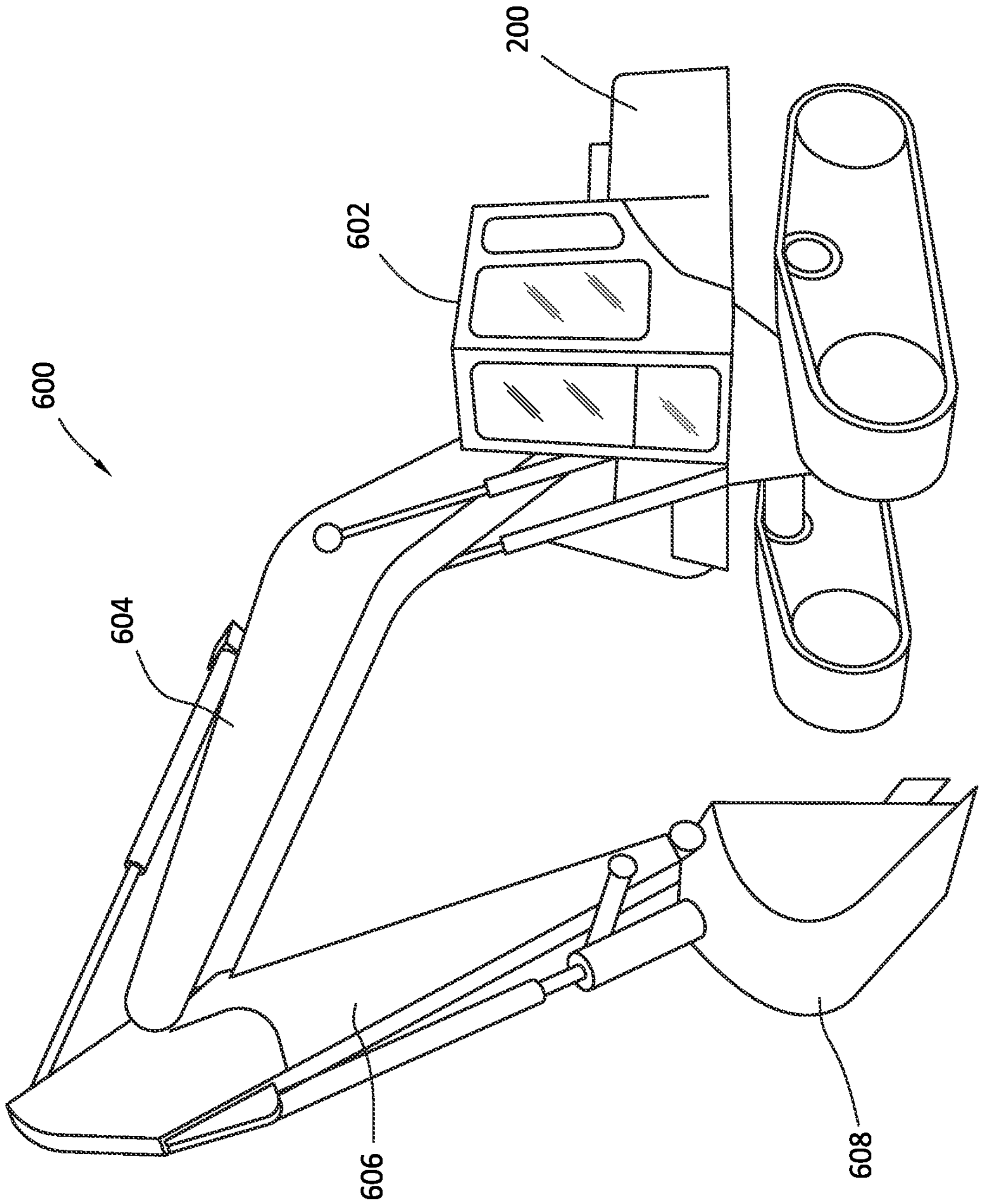
FIGS. 6 and 7 are representative example systems for a subterranean operation that may also benefit from a power system with an ESS, in accordance with certain embodiments.
Figure 7:
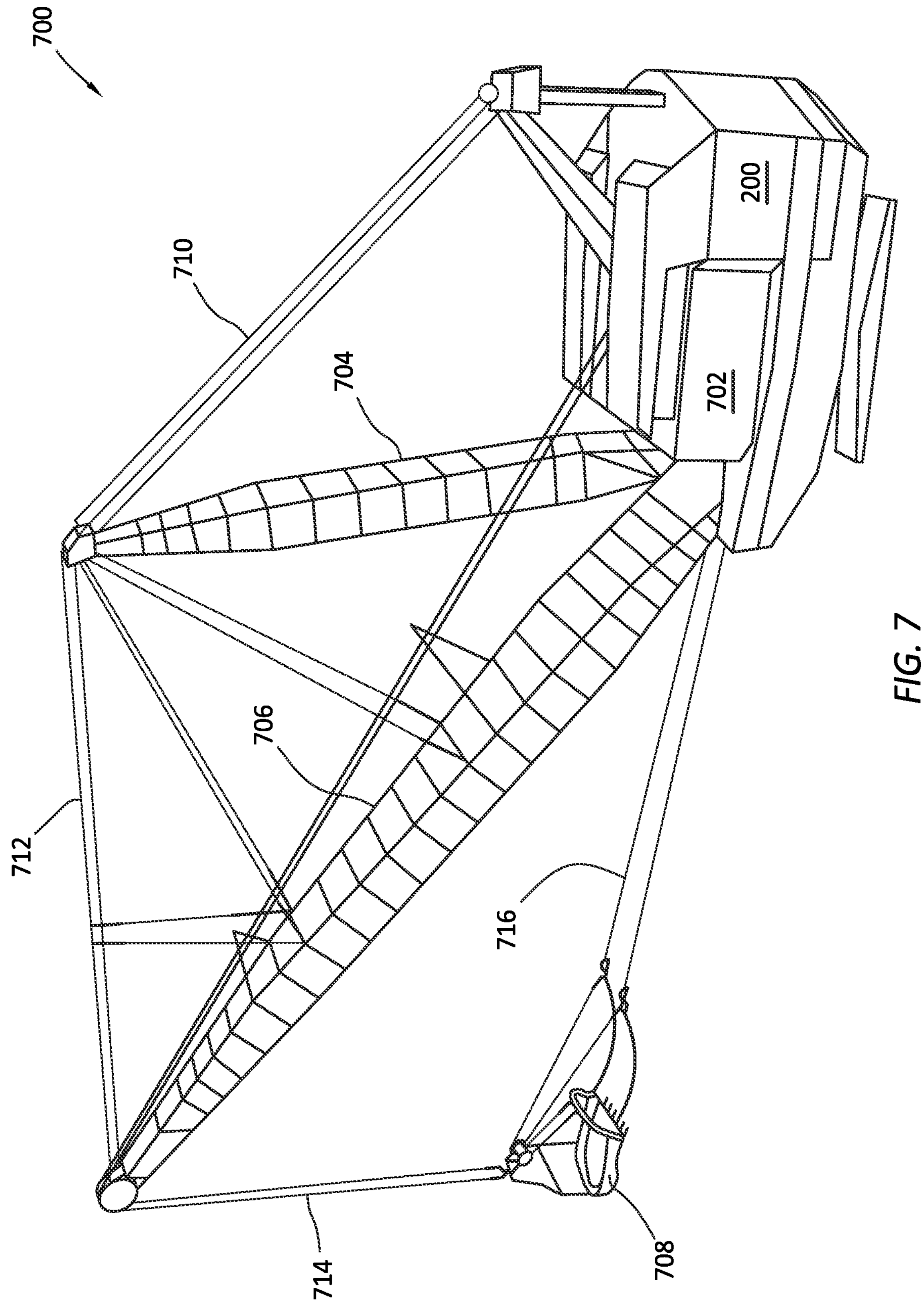

FIGS. 6 and 7 are representative example systems 600, 700 that may also benefit from a power system 200 with an ESS 300 contained within a respective chassis 602, 702. FIG. 6 shows an excavator 600 that can use an ESS 300 as described above to increase the efficiency of the power system 200, by leveling out a load on the one or more generators 202, storing power regenerated from lowering the arms 604, 606 and the bucket 608. The power system 200 can reduce emissions for the excavator 600.

FIG. 7 shows an excavator 700 that can use an ESS 300 as described above to increase the efficiency of the power system 200, by leveling out a load on the one or more generators 202, storing power regenerated from lowering the arms 704, 706 and the bucket 708 via manipulations of the cables 710, 712, 714, and 716. The power system 200 can reduce emissions for the excavator or dredging machine 700.

Figure 8:
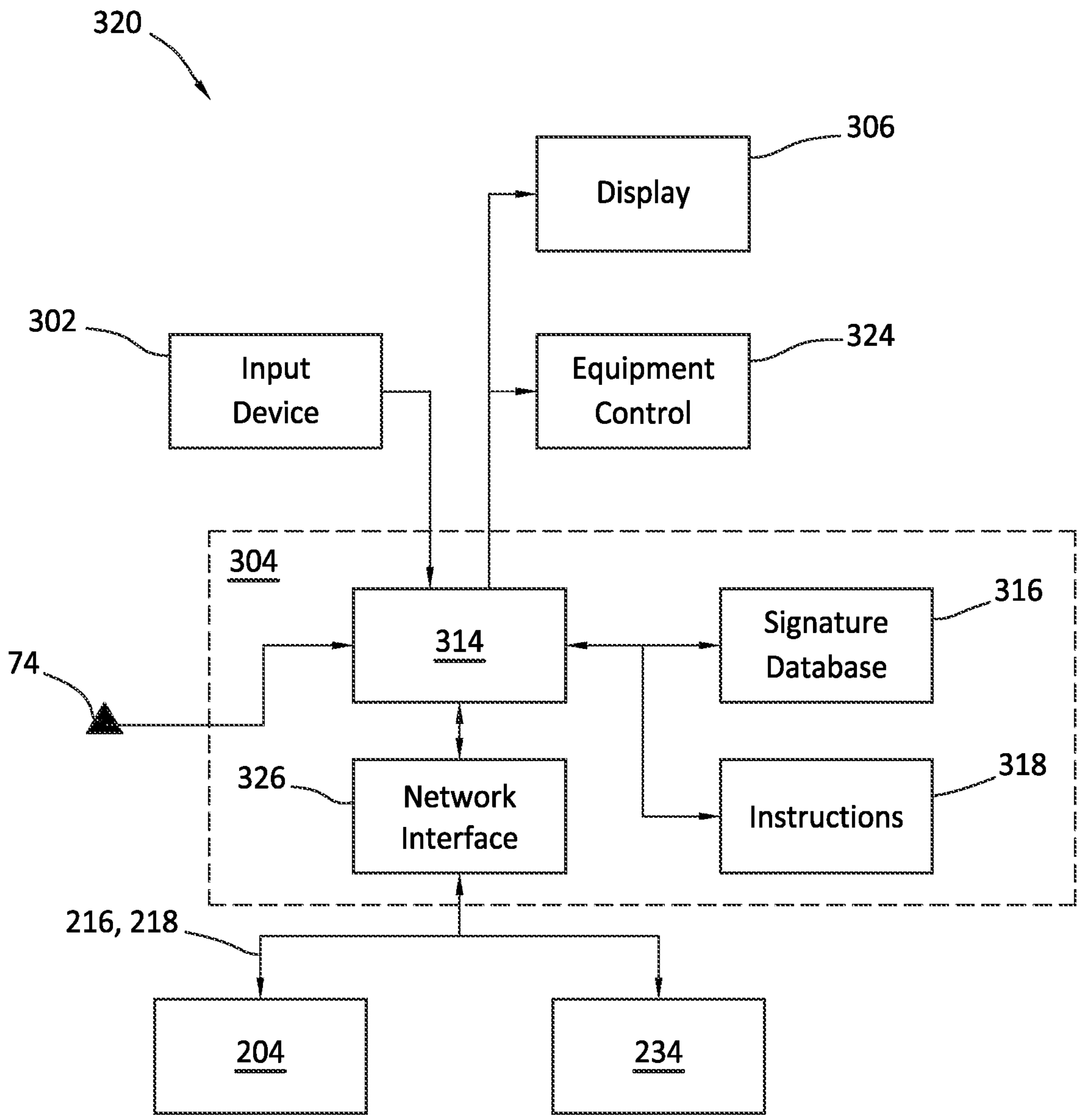
FIG. 8 is a representative functional block diagram of a control system for controlling the operation of the ESS in a power system, in accordance with certain embodiments.

FIG. 8 is a representative functional block diagram of a control system 320 for controlling operation of the ESS 300 in a power system 200, via controllers 204, 234, 304, user interface devices 302, 306, and equipment control 324. The control system 320 can include an ESS controller 304 that can include one or more processors 314 communicatively coupled to non-transitory memory for storing a signature database 316 and instructions 318. The processors 314 can retrieve instructions 318 from the non-transitory memory to execute any of the methods in this disclosure. The processors 314 can communicate through the network interface 326 to the generator controller 204 and the VFD controllers 234 via wired or wireless network connections 216, 218. The processors 314 can receive sensor data from the sensors 74 positioned around the power system 200. Users can input data to the ESS controller 304 via the input device 302 and respond to suggested actions displayed on the display 306. When the ESS controller 304 determines that actions need to be taken regarding charging or discharging the energy storage devices C1, C2, then the ESS controller 304 can control the power system 200 equipment (e.g., breakers 222, 224, 322, rectifiers 206, inverters 336, 338, 340, the PESS 330, inverters 240 via VFD controllers 234, the generators 202 via generator controller 204, etc.) via the equipment control 324.

Various Embodiments

Embodiment 1. A method of managing a power system comprising:

energizing an alternating current (AC) bus via one or more generators;

rectifying energy from the AC bus to power a direct current (DC) bus;

powering one or more loads electrically coupled to the DC bus;

monitoring a DC voltage of the DC bus;

detecting a magnitude and a rate of change of the DC voltage (VDC) from a predetermined VDC level; and transferring an amount of power between the DC bus and an energy storage system (ESS) electrically coupled to the DC bus to return the DC voltage substantially to the predetermined VDC level, wherein the amount of power is based on the magnitude and rate of change of the DC voltage.

Embodiment 2. The method of embodiment 1, wherein two or more of the one or more loads are coupled to the DC bus in parallel with each other.

Embodiment 3. The method of embodiment 1, wherein an AC voltage (VAC) of the AC bus is substantially 480 VAC, substantially 600 VAC, or substantially 690 VAC.

Embodiment 4. The method of embodiment 1, wherein the predetermined VDC level is greater than 650 VDC and less than 975 VDC.

Embodiment 5. The method of embodiment 1, wherein the ESS comprises a plurality of energy storage devices.

Embodiment 6. The method of embodiment 5, wherein the plurality of energy storage devices comprise ultracapacitors.

Embodiment 7. The method of embodiment 5, wherein the plurality of energy storage devices comprises a combination of one or more capacitors and one or more batteries.

Embodiment 8. The method of embodiment 1, wherein the magnitude and the rate of change indicate a drop in the DC voltage.

Embodiment 9. The method of embodiment 8, further comprising:

transferring the amount of power from the ESS to the DC bus to return the DC voltage substantially to the predetermined VDC level; and discharging the ESS to supply the amount of power.

Embodiment 10. The method of embodiment 1, wherein the magnitude and the rate of change indicate a spike in the DC voltage.

Embodiment 11. The method of embodiment 10, further comprising:

transferring the amount of power from the DC bus to the ESS to return the DC voltage substantially to the predetermined VDC level; and charging the ESS to store the amount of power.

Embodiment 12. The method of embodiment 10, further comprising:

transferring the amount of power from the DC bus to the ESS to return the DC voltage substantially to the predetermined VDC level; and dissipating the amount of power in one or more load banks of resistors.

Embodiment 13. The method of embodiment 1, further comprising:

determining a signature based on a ratio of the magnitude to the rate of change.

Embodiment 14. The method of embodiment 13, further comprising:

comparing, via an ESS controller, the signature to a signature database;

identifying the signature in the signature database; and determining the amount of power from the signature database.

Embodiment 15. The method of embodiment 13, further comprising:

comparing, via an ESS controller, the signature to a signature database;

determining that the signature is not in the signature database;

transferring the amount of power from the ESS to the DC bus to raise the DC voltage substantially to the predetermined VDC level; and storing the signature in the signature database for future comparison, the signature being associated in the signature database with the amount of power.

Embodiment 16. The method of embodiment 13, further comprising:

detecting actual environmental conditions when the change of the DC voltage occurs.

Embodiment 17. The method of embodiment 16, further comprising:

comparing, via an ESS controller, the signature to a signature database;

matching the signature to one of a plurality of stored signatures in the signature database, wherein each one of the plurality of stored signatures in the signature database is associated with historical environmental conditions detected when the respective one of the plurality of stored signatures was captured;

determining the amount of power from the signature database; and comparing, via the ESS controller, the actual environmental conditions to the historical environmental conditions; and adjusting the amount of power based on the comparing of the actual environmental conditions to the historical environmental conditions.

Embodiment 18. The method of embodiment 1, further comprising:

prior to energizing the AC bus, receiving VDC auxiliary power from a portable energy storage system (PESS) that is electrically coupled to the DC bus via the ESS;

converting the VDC auxiliary power from the DC bus to VAC auxiliary power on the AC bus;

energizing an electric start motor via the VAC auxiliary power;

starting at least one of the one or more generators via the electric start motor; and then energizing the AC bus via the one or more generators.

Embodiment 19. A method of managing a power system comprising:

energizing an alternating current (AC) bus via one or more generators;

rectifying energy from the AC bus to power a direct current (DC) bus;

powering one or more loads electrically coupled to the DC bus;

monitoring an AC voltage of the AC bus;

detecting a change in frequency of the AC voltage from a predetermined AC voltage frequency to a changed AC voltage frequency; and transferring an amount of power between the AC bus and an energy storage system (ESS) electrically coupled to the AC bus to return the frequency of the AC voltage substantially to the predetermined AC voltage frequency, wherein the amount of power is based on a magnitude of the change in the frequency of the AC voltage.

Embodiment 20. The method of embodiment 19, wherein two or more of the one or more loads are coupled to the DC bus in parallel with each other.

Embodiment 21. The method of embodiment 19, wherein the predetermined AC voltage frequency is substantially 50 hertz (Hz) or substantially 60 Hz.

Embodiment 22. The method of embodiment 19, wherein an AC voltage (VAC) of the AC bus is substantially 480 VAC, substantially 600 VAC, or substantially 690 VAC.

Embodiment 23. The method of embodiment 19, wherein a DC voltage (VDC) of the DC bus is greater than 650 VDC and less than 975 VDC.

Embodiment 24. The method of embodiment 19, wherein the ESS comprises a plurality of energy storage devices.

Embodiment 25. The method of embodiment 24, wherein the plurality of energy storage devices comprise ultracapacitors.

Embodiment 26. The method of embodiment 24, wherein the plurality of energy storage devices comprises a combination of one or more capacitors and one or more batteries.

Embodiment 27. The method of embodiment 19, wherein the change in the frequency of the AC voltage indicates a decrease in the frequency of the AC voltage.

Embodiment 28. The method of embodiment 27, further comprising:

transferring the amount of power from the ESS to the AC bus to return the AC voltage substantially to the predetermined AC voltage frequency; and discharging the ESS to supply the amount of power.

Embodiment 29. The method of embodiment 19, wherein the change in the frequency of the AC voltage indicates an increase in the frequency of the AC voltage.

Embodiment 30. The method of embodiment 29, further comprising:

transferring the amount of power from the AC bus to the ESS to return the AC voltage substantially to the predetermined AC voltage frequency; and charging the ESS to store the amount of power.

Embodiment 31. The method of embodiment 29, further comprising:

transferring the amount of power from the AC bus to the ESS to return the AC voltage substantially to the predetermined AC voltage frequency; and dissipating the amount of power in one or more load banks of resistors.

Embodiment 32. The method of embodiment 19, further comprising:

determining a signature based on a magnitude and a rate of the change in the frequency of the AC voltage.

Embodiment 33. The method of embodiment 32, further comprising:

comparing, via an ESS controller, the signature to a signature database;

identifying the signature in the signature database; and determining the amount of power from the signature database.

Embodiment 34. The method of embodiment 32, further comprising:

comparing, via an ESS controller, the signature to a signature database;

determining that the signature is not in the signature database;

transferring the amount of power from the ESS to the AC bus to return the AC voltage substantially to the predetermined AC voltage frequency; and storing the signature in the signature database for future comparison, the signature being associated in the signature database with the amount of power.

Embodiment 35. The method of embodiment 32, further comprising:

detecting actual environmental conditions when the change of the AC voltage frequency occurs.

Embodiment 36. The method of embodiment 35, further comprising:

comparing, via an ESS controller, the signature to a signature database;

matching the signature to one of a plurality of stored signatures in the signature database, wherein each one of the plurality of stored signatures in the signature database is associated with historical environmental conditions detected when the respective one of the plurality of stored signatures was captured;

determining the amount of power from the signature database; and comparing, via the ESS controller, the actual environmental conditions to the historical environmental conditions; and adjusting the amount of power based on the comparing of the actual environmental conditions to the historical environmental conditions.

Embodiment 37. The method of embodiment 19, further comprising:

monitoring a DC voltage of the DC bus;

detecting a magnitude and a rate of change of the DC voltage from a predetermined DC voltage level; and transferring an amount of power between the DC bus and the ESS to return the DC voltage substantially to the predetermined DC voltage level, wherein the amount of power is based on the magnitude and rate of change of the DC voltage.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

The invention claimed is:

1. A method of managing a power system comprising:

energizing an alternating current (AC) bus via one or more generators;

rectifying energy from the AC bus to power a direct current (DC) bus;

powering one or more loads electrically coupled to the DC bus;

monitoring a DC voltage of the DC bus;

detecting a magnitude and a rate of change of the DC voltage (VDC) from a predetermined VDC level; and transferring an amount of power between the DC bus and an energy storage system (ESS) electrically coupled to the DC bus to return the DC voltage substantially to the predetermined VDC level, wherein the amount of power is based on the magnitude and the rate of change of the DC voltage.

2. The method of claim 1, wherein the ESS comprises a plurality of energy storage devices, and, wherein at least a portion of the plurality of energy storage devices comprise ultracapacitors.

3. The method of claim 1, wherein the magnitude and the rate of change indicate a drop in the DC voltage, and wherein the method further comprises: transferring the amount of power from the ESS to the DC bus to return the DC voltage substantially to the predetermined VDC level; and discharging the ESS to supply the amount of power.

4. The method of claim 1, wherein the magnitude and the rate of change indicate a spike in the DC voltage, and wherein the method further comprises:

transferring the amount of power from the DC bus to the ESS to return the DC voltage substantially to the predetermined VDC level; and charging the ESS to store the amount of power.

5. The method of claim 1, further comprising:

determining a signature based on a ratio of the magnitude to the rate of change.

6. The method of claim 5, further comprising:

comparing, via an ESS controller, the signature to a signature database;

identifying the signature in the signature database; and determining the amount of power from the signature database.

7. The method of claim 5, further comprising:

comparing, via an ESS controller, the signature to a signature database;

determining that the signature is not in the signature database;

transferring the amount of power from the ESS to the DC bus to raise the DC voltage substantially to the predetermined VDC level; and storing the signature in the signature database for future comparison, the signature being associated in the signature database with the amount of power.

8. The method of claim 5, further comprising:

detecting actual environmental conditions when the magnitude and the rate of change of the DC voltage from the predetermined VDC level is detected.

9. The method of claim 8, further comprising:

comparing, via an ESS controller, the signature to a signature database;

matching the signature to one of a plurality of stored signatures in the signature database, wherein each one of the plurality of stored signatures in the signature database is associated with historical environmental conditions detected when a respective one of the plurality of stored signatures was captured;

determining the amount of power from the signature database; and comparing, via the ESS controller, the actual environmental conditions to the historical environmental conditions; and adjusting the amount of power based on the comparing of the actual environmental conditions to the historical environmental conditions.

10. The method of claim 1, further comprising:

prior to energizing the AC bus, receiving VDC auxiliary power from a portable energy storage system (PESS) that is electrically coupled to the DC bus via the ESS;

converting the VDC auxiliary power from the DC bus to VAC auxiliary power on the AC bus;

energizing an electric start motor via the VAC auxiliary power;

starting at least one of the one or more generators via the electric start motor; and then energizing the AC bus via the one or more generators.

11. A method of managing a power system comprising:

energizing an alternating current (AC) bus via one or more generators;

rectifying energy from the AC bus to power a direct current (DC) bus;

powering one or more loads electrically coupled to the DC bus;

monitoring an AC voltage of the AC bus;

detecting a change in frequency of the AC voltage from a predetermined AC voltage frequency to a changed AC voltage frequency;

determining a signature based on a magnitude and a rate of the change in the frequency of the AC voltage; and transferring an amount of power between the AC bus and an energy storage system (ESS) electrically coupled to the AC bus to return the frequency of the AC voltage substantially to the predetermined AC voltage frequency, wherein the amount of power is based on the signature of the AC voltage.

12. The method of claim 11, wherein the ESS comprises a plurality of energy storage devices, and wherein at least a portion of the plurality of energy storage devices comprise ultracapacitors.

13. The method of claim 11, wherein the change in the frequency of the AC voltage indicates a decrease in the frequency of the AC voltage, and wherein the method further comprises:

transferring the amount of power from the ESS to the AC bus to return the AC voltage substantially to the predetermined AC voltage frequency; and discharging the ESS to supply the amount of power.

14. The method of claim 11, wherein the change in the frequency of the AC voltage indicates an increase in the frequency of the AC voltage, and wherein the method further comprises transferring the amount of power from the AC bus to the ESS to return the AC voltage substantially to the predetermined AC voltage frequency; and charging the ESS to store the amount of power.

15. The method of claim 11, further comprising:

comparing, via an ESS controller, the signature to a signature database;

identifying the signature in the signature database; and determining the amount of power from the signature database.

16. The method of claim 11, further comprising:

comparing, via an ESS controller, the signature to a signature database;

determining that the signature is not in the signature database;

transferring the amount of power from the ESS to the AC bus to return the AC voltage substantially to the predetermined AC voltage frequency; and storing the signature in the signature database for future comparison, the signature being associated in the signature database with the amount of power.

17. The method of claim 11, further comprising:

detecting actual environmental conditions when the change in the frequency of the AC voltage is detected.

18. The method of claim 17, further comprising:

comparing, via an ESS controller, the signature to a signature database;

matching the signature to one of a plurality of stored signatures in the signature database, wherein each one of the plurality of stored signatures in the signature database is associated with historical environmental conditions detected when a respective one of the plurality of stored signatures was captured;

determining the amount of power from the signature database; and comparing, via the ESS controller, the actual environmental conditions to the historical environmental conditions; and adjusting the amount of power based on the comparing of the actual environmental conditions to the historical environmental conditions.

19. The method of claim 11, further comprising:

monitoring a DC voltage of the DC bus;

detecting a DC magnitude and a DC rate of change of the DC voltage from a predetermined DC voltage level; and transferring a DC amount of power between the DC bus and the ESS to return the DC voltage substantially to the predetermined DC voltage level, wherein the DC amount of power is based on the DC magnitude and the DC rate of change of the DC voltage.

* * * * *